United States Patent
Yamamoto

(10) Patent No.: US 10,542,434 B2
(45) Date of Patent: Jan. 21, 2020

(54) EVALUATING AS TO WHETHER OR NOT A WIRELESS TERMINAL IS AUTHORIZED

(71) Applicant: NEC Platforms, Ltd., Kawasaki-shi, Kanagawa (JP)

(72) Inventor: Takuya Yamamoto, Kanagawa (JP)

(73) Assignee: NEC PLATFORMS, LTD., Kanagawa (JP)

(*) Notice: Subject to any disclaimer, the term of this patent is extended or adjusted under 35 U.S.C. 154(b) by 26 days.

(21) Appl. No.: 15/751,933

(22) PCT Filed: Mar. 31, 2016

(86) PCT No.: PCT/JP2016/001862
§ 371 (c)(1),
(2) Date: Feb. 12, 2018

(87) PCT Pub. No.: WO2017/037964
PCT Pub. Date: Mar. 9, 2017

(65) Prior Publication Data
US 2018/0242157 A1    Aug. 23, 2018

(30) Foreign Application Priority Data
Sep. 1, 2015   (JP) .................................. 2015-172021

(51) Int. Cl.
*H04W 12/12*    (2009.01)
*H04L 29/06*    (2006.01)
(Continued)

(52) U.S. Cl.
CPC ............. *H04W 12/12* (2013.01); *H04L 63/08* (2013.01); *H04W 8/22* (2013.01); *H04W 12/06* (2013.01);
(Continued)

(58) Field of Classification Search
CPC ................. H04L 63/08; H04L 63/101; H04W 12/00512; H04W 12/06; H04W 12/08;
(Continued)

(56) References Cited

U.S. PATENT DOCUMENTS

2006/0045272 A1    3/2006  Ohaka
2009/0119776 A1*   5/2009  Palnitkar ................. G06Q 20/10
                                                        726/25
(Continued)

FOREIGN PATENT DOCUMENTS

JP    2006-067174 A    3/2006
JP    2010-273205 A   12/2010
(Continued)

OTHER PUBLICATIONS

International Search Report for PCT Application No. PCT/JP2016/001862, dated Jun. 21, 2016.
(Continued)

*Primary Examiner* — Mewale A Ambaye

(57) ABSTRACT

A wireless communication apparatus (1) includes an information acquisition unit (10) for acquiring information about a wireless terminal when the wireless terminal is wirelessly connected to the wireless communication apparatus, a storage unit (11) for storing the information about an authorized terminal acquired by the information acquisition unit (10) in association with an individual identifier of the authorized wireless terminal, and an evaluation unit (12) for evaluating as to whether or not the wireless terminal wirelessly connected to the wireless communication apparatus is an authorized wireless terminal. The information includes at least fixed information other than the individual identifier. The evaluation unit (12) makes the evaluation based on a degree of matching between the information about the wireless terminal to be evaluated acquired by the information acqui-
(Continued)

sition unit (10) and the information stored in the storage unit (11).

13 Claims, 15 Drawing Sheets

(51) Int. Cl.
*H04W 8/22* (2009.01)
*H04W 12/06* (2009.01)
*H04W 12/08* (2009.01)
*H04W 48/04* (2009.01)
*H04W 84/12* (2009.01)
*H04W 12/00* (2009.01)

(52) U.S. Cl.
CPC ....... *H04W 12/08* (2013.01); *H04W 12/0808* (2019.01); *H04W 48/04* (2013.01); *H04L 63/101* (2013.01); *H04W 12/00512* (2019.01); *H04W 12/1202* (2019.01); *H04W 84/12* (2013.01)

(58) Field of Classification Search
CPC . H04W 12/0808; H04W 12/12; H04W 12/02; H04W 48/04; H04W 48/12; H04W 8/22
See application file for complete search history.

(56) References Cited

U.S. PATENT DOCUMENTS

| | | | | |
|---|---|---|---|---|
| 2010/0299725 A1* | 11/2010 | Yamada | ................ | H04L 1/1607 726/4 |
| 2014/0362841 A1* | 12/2014 | Shibata | ................. | H04W 48/18 370/338 |
| 2017/0150362 A1* | 5/2017 | Clemenson | ........... | H04W 48/12 |
| 2018/0242157 A1* | 8/2018 | Yamamoto | ............ | H04W 12/12 |
| 2018/0338244 A1* | 11/2018 | Singhal | ................. | H04W 76/10 |

FOREIGN PATENT DOCUMENTS

| | | |
|---|---|---|
| JP | 2014-241487 A | 12/2014 |
| JP | 2015-057892 A | 3/2015 |

OTHER PUBLICATIONS

Japanese Office Action for JP Application No. 2015-172021 dated Jun. 21, 2016 with English Translation.
Japanese Office Action (Decision to Grant a Patent) for JP Application No. 2015-172021 dated Dec. 6, 2016 with English Translation.

* cited by examiner

Fig. 8

MAC ADDRESS A
- CONNECTION TIME a1 : RECEIVED RADIO WAVE STRENGTH a1_1 : DIRECTION a1 : FIXED INFORMATION a1 : COMMUNICATION DESTINATION INFORMATION a1_1 : COMMUNICATION DESTINATION INFORMATION a1_2 ...

- CONNECTION TIME a2 : RECEIVED RADIO WAVE STRENGTH a2_1 : DIRECTION a2 : FIXED INFORMATION a2 : COMMUNICATION DESTINATION INFORMATION a2_1 : COMMUNICATION DESTINATION INFORMATION a2_2 ...

- CONNECTION TIME a3 : RECEIVED RADIO WAVE STRENGTH a3_1 : DIRECTION a3 : FIXED INFORMATION a3 : COMMUNICATION DESTINATION INFORMATION a3_1 : COMMUNICATION DESTINATION INFORMATION a3_2 ...
...

MAC ADDRESS B
- CONNECTION TIME b1 : RECEIVED RADIO WAVE STRENGTH b1_1 : DIRECTION b1 : FIXED INFORMATION b1 : COMMUNICATION DESTINATION INFORMATION b1_1 : COMMUNICATION DESTINATION INFORMATION b1_2 ...

- CONNECTION TIME b2 : RECEIVED RADIO WAVE STRENGTH b2_1 : DIRECTION b2 : FIXED INFORMATION b2 : COMMUNICATION DESTINATION INFORMATION b2_1 : COMMUNICATION DESTINATION INFORMATION b2_2 ...

- CONNECTION TIME b3 : RECEIVED RADIO WAVE STRENGTH b3_1 : DIRECTION b3 : FIXED INFORMATION b3 : COMMUNICATION DESTINATION INFORMATION b3_1 : COMMUNICATION DESTINATION INFORMATION b3_2 ...
...

MAC ADDRESS C
- CONNECTION TIME c1 : RECEIVED RADIO WAVE STRENGTH c1_1 : DIRECTION c1 : FIXED INFORMATION c1 : COMMUNICATION DESTINATION INFORMATION c1_1 : COMMUNICATION DESTINATION INFORMATION c1_2 ...

- CONNECTION TIME c2 : RECEIVED RADIO WAVE STRENGTH c2_1 : DIRECTION c2 : FIXED INFORMATION c2 : COMMUNICATION DESTINATION INFORMATION c2_1 : COMMUNICATION DESTINATION INFORMATION c2_2 ...

- CONNECTION TIME c3 : RECEIVED RADIO WAVE STRENGTH c3_1 : DIRECTION c3 : FIXED INFORMATION c3 : COMMUNICATION DESTINATION INFORMATION c3_1 : COMMUNICATION DESTINATION INFORMATION c3_2 ...
...

Fig. 12

| TEMPORAL EVALUATION ITEM | TEMPORAL EVALUATION RESULT | WEIGHTING | VALUE |
|---|---|---|---|
| CONNECTION TIME | UNAUTHORIZED→1 | WEIGHTING MEDIUM (×2) | 2 |
| RECEIVED RADIO WAVE STRENGTH | AUTHORIZED→0 | WEIGHTING LIGHT (×1) | 0 |
| DIRECTION | AUTHORIZED→0 | WEIGHTING LIGHT (×1) | 0 |
| FIXED INFORMATION | UNAUTHORIZED→1 | WEIGHTING HEAVY (×3) | 3 |
| COMMUNICATION DESTINATION INFORMATION | UNAUTHORIZED→1 | WEIGHTING MEDIUM (×2) | 2 |
| | | TOTAL | 7 |

EVALUATING AS TO WHETHER OR NOT A WIRELESS TERMINAL IS AUTHORIZED

This application is a National Stage Entry of PCT/JP2016/001862 filed on Mar. 31, 2016, which claims priority from Japanese Patent Application 2015-172021 filed on Sep. 1, 2015, the contents of all of which are incorporated herein by reference, in their entirety.

TECHNICAL FIELD

The present disclosure relates to a wireless communication apparatus, a wireless communication system, an evaluation method, and a non-transitory computer readable medium storing a program. In particular, the present disclosure relates to a wireless communication apparatus, a wireless communication system, an evaluation method, and a non-transitory computer readable medium storing a program that evaluates as to whether or not a wireless terminal is authorized.

BACKGROUND ART

Recently, free rides on a wireless LAN (Local Area Network) have become a problem. The cases where such free rides occur are not limited to a case where connection authentication is not performed and a case where communication is not encrypted. For example, even when encryption is configured, if an encryption key is easily guessed (e.g., 12345678, etc.), unauthorized users can free ride easily. Further, even when a master device implements the "MAC address filtering" function that allows connections only to wireless terminals with allowed MAC (Media Access Control) addresses, a slave device that spoofs a MAC address may be allowed to free ride.

To address such a problem, Patent Literature 1 discloses a technique for preventing unauthorized access by checking a sequence number included in a frame or received radio wave strength at the time of communication with a wireless terminal.

CITATION LIST

Patent Literature

Patent Literature 1: Japanese Unexamined Patent Application Publication No. 2010-273205

SUMMARY OF INVENTION

Technical Problem

However, with the technique described in Patent Literature 1, only a value that varies for each wireless connection, such as a sequence number or received radio wave strength, is used as an evaluation criteria. Thus, there could be an erroneous evaluation. Additionally, in the evaluation described in Patent Literature 1, the transition of the sequence number or the transition of the received radio wave strength before and after an occurrence of unauthorized access is checked. This means that the evaluation method described in Patent Literature 1 is based on the assumption that there has been access from an authorized wireless terminal just before the unauthorized access occurs.

An object of the present disclosure is to solve such a problem and to provide a wireless communication apparatus, a wireless communication system, an evaluation method, and a non-transitory computer readable medium storing a program that can detect a wireless connection from an unauthorized wireless terminal even when an individual identifier such as a MAC address is spoofed.

Solution to Problem

In an example aspect of the present disclosure, a wireless communication apparatus includes: information acquisition means for acquiring information about a wireless terminal when the wireless terminal is wirelessly connected to the wireless communication apparatus; storage means for storing the information about an authorized terminal acquired by the information acquisition means in association with an individual identifier of the authorized wireless terminal; and evaluation means for evaluating as to whether or not the wireless terminal wirelessly connected to the wireless communication apparatus is an authorized wireless terminal. The information includes at least fixed information other than the individual identifier. The evaluation means makes the evaluation based on a degree of matching between the information about the wireless terminal to be evaluated acquired by the information acquisition means and the information stored in the storage means.

In another example aspect of the present disclosure, a wireless communication system includes: information acquisition means for acquiring information about a wireless terminal when the wireless terminal is wirelessly connected to a wireless communication apparatus; storage means for storing the information about an authorized terminal acquired by the information acquisition means in association with an individual identifier of the authorized wireless terminal; and evaluation means for evaluating as to whether or not the wireless terminal wirelessly connected to the wireless communication apparatus is an authorized wireless terminal. The information includes at least fixed information other than the individual identifier. The evaluation means makes the evaluation based on a degree of matching between the information about the wireless terminal to be evaluated acquired by the information acquisition means and the information stored in the storage means.

In another example aspect, an evaluation method includes: an information acquisition step of acquiring information about a wireless terminal when the wireless terminal is wirelessly connected to a wireless communication apparatus; an storing step of storing the information about an authorized terminal acquired in the information acquisition step in association with an individual identifier of the authorized wireless terminal; and an evaluating step of evaluating as to whether or not the wireless terminal wirelessly connected to the wireless communication apparatus is an authorized wireless terminal. The information includes at least fixed information other than the individual identifier. In the evaluating step, the evaluation is made based on a degree of matching between information about the wireless terminal to be evaluated acquired in the information acquisition step and the stored information.

In another example aspect, a program causes a computer to execute: an information acquisition step of acquiring information about a wireless terminal when the wireless terminal is wirelessly connected to a wireless communication apparatus; an storing step of storing, in a storage unit, the information about an authorized terminal acquired in the information acquisition step in association with an individual identifier of the authorized wireless terminal; and an evaluating step of evaluating as to whether or not the wireless terminal wirelessly connected to the wireless communication apparatus is an authorized wireless terminal. The information includes at least fixed information other than the individual identifier. In the evaluating step, the evaluation is made based on a degree of matching between information about the wireless terminal to be evaluated acquired in the information acquisition step and the information stored in the storage unit.

Advantageous Effects of Invention

According to the present disclosure, it is possible to provide a wireless communication apparatus, a wireless communication system, an evaluation method, and a non-transitory computer readable medium storing a program that can detect a wireless connection from an unauthorized wireless terminal even when an individual identifier such as a MAC address is spoofed.

BRIEF DESCRIPTION OF DRAWINGS

FIG. 8 is a schematic diagram showing an example of a management table stored in a storage unit;

FIG. 12 is a table showing an example of a final evaluation method by an evaluation unit;

DESCRIPTION OF EMBODIMENTS

Overview of Embodiments

Figure 1:
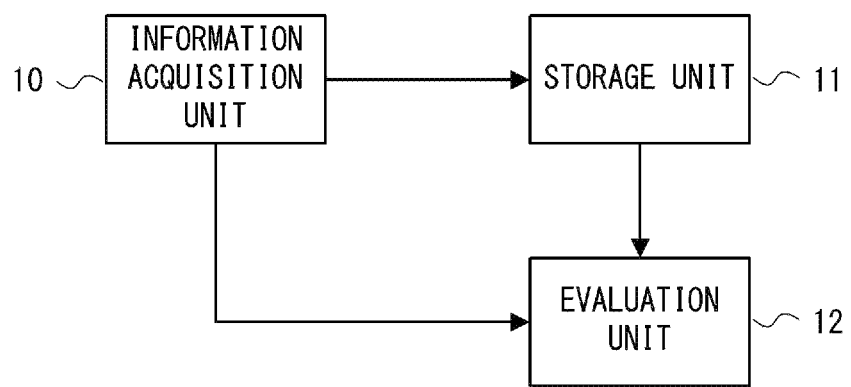
FIG. 1 is a block diagram showing an overview of a configuration of a wireless communication apparatus according to embodiments.

An overview of embodiments according to the present disclosure will be described prior to describing the embodiments. FIG. 1 is a block diagram showing an overview of a configuration of a wireless communication apparatus 1 according to the embodiment. As shown in FIG. 1, the wireless communication apparatus 1 includes an information acquisition unit 10, a storage unit 11, and an evaluation unit 12. The wireless communication apparatus 1 functions as a master device and performs wireless communication with a wireless terminal functioning as a slave device. In the following description, the wireless terminal may be referred to as a slave device.

When the wireless terminal is wirelessly connected to the wireless communication apparatus 1, the information acquisition unit 10 acquires information about the wireless terminal. Specifically, the information acquisition unit 10 acquires an individual identifier for identifying the wireless terminal and information other than the individual identifier as the information about the wireless terminal. More specifically, the information acquisition unit 10 includes at least fixed information other than the individual identifier as the information about the wireless terminal. The fixed information here is information having a value does not vary. That is, the fixed information is information about a value fixed to the wireless terminal.

The storage unit 11 is, for example, a storage apparatus such as a memory or a storage. The storage unit 11 stores information about an authorized wireless terminal acquired by the information acquisition unit 10. For example, the information acquisition unit 10 regards the wireless terminal that has been wirelessly connected within a predetermined period as an authorized wireless terminal, and stores the information about this wireless terminal in the storage unit 11. The storage unit 11 stores the information acquired by the information acquisition unit 10 in association with the individual identifier. Therefore, in the storage unit 11, the individual identifier of the authorized wireless terminal and the information about this wireless terminal are stored in association with each other.

The evaluation unit 12 evaluates as to whether or not the wireless terminal that has been wirelessly connected to the wireless communication apparatus 1 is an authorized wireless terminal. Here, the evaluation unit 12 makes the evaluation based on a degree of matching between the information about the wireless terminal to be evaluated acquired by the information acquisition unit 10 and the information stored in the storage unit 11.

When the wireless connection is from an unauthorized wireless terminal, the degree of matching between the information about the wireless terminal acquired by the information acquisition unit 10 and the information stored in the storage unit 11 is lower than that when the wireless connection is from an authorized wireless terminal. As the evaluation unit 12 checks the degree of matching based on the information other than the individual identifier, even when the individual identifier such as the MAC address is spoofed, it is possible to detect a wireless connection from the unauthorized wireless terminal. In addition, the evaluation using the fixed information other than the individual identifier contributes to preventing erroneous evaluations caused by using only variable values, which are unstable values.

First Embodiment

Figure 2:
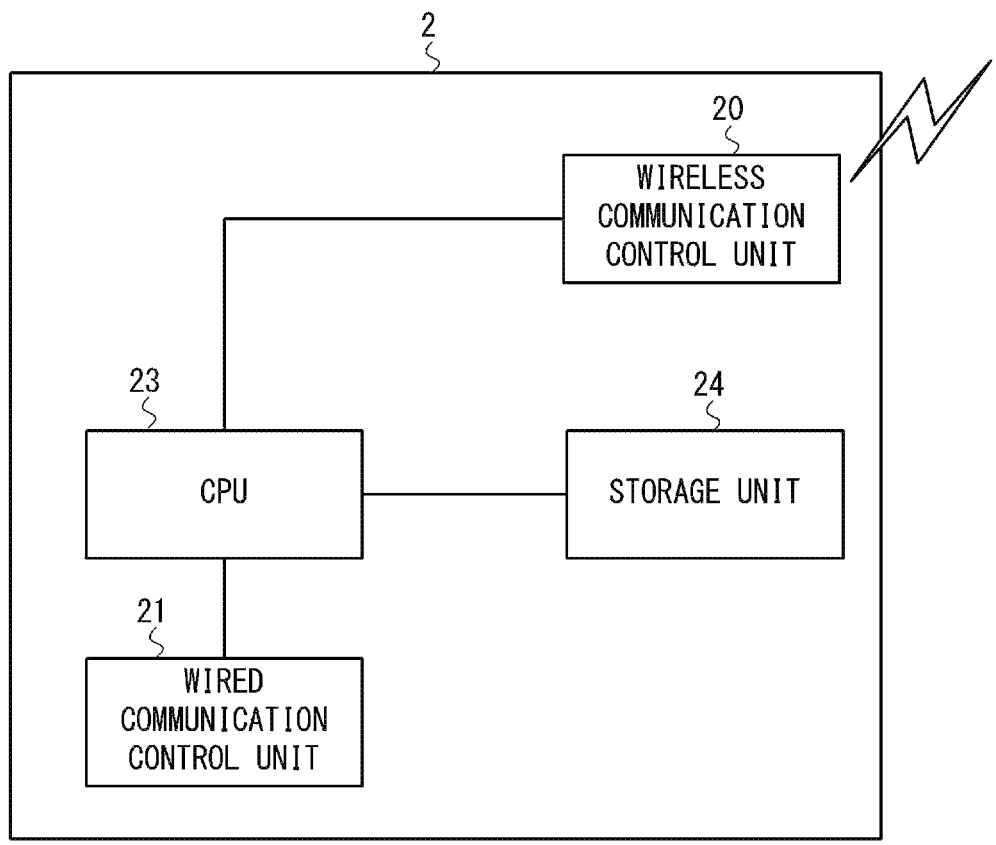
FIG. 2 is a block diagram showing a hardware configuration of the wireless communication apparatus according to the first embodiment.

Hereinafter, a first embodiment will be described. FIG. 2 is a block diagram showing a hardware configuration of a wireless communication apparatus 2 according to the first embodiment. As shown in FIG. 2, the wireless communication apparatus 2 includes a wireless communication control unit 20, a wired communication control unit 21, a CPU (Central Processing Unit) 23, and a storage unit 24. The wireless communication apparatus 2 is a wireless LAN access point and functions as a master device.

The wireless communication control unit 20 includes an antenna (not shown), a transmission/reception circuit (not shown) and the like. The wireless communication control unit 20 performs control for wireless communication with wireless terminals functioning as slave devices. In this embodiment, the wireless communication control unit 20 performs wireless communication in accordance with the wireless communication standard IEEE 802.11. However, the wireless communication control unit 20 may perform the wireless communication in accordance with other wireless communication standards instead of IEEE 802.11.

Figure 3:
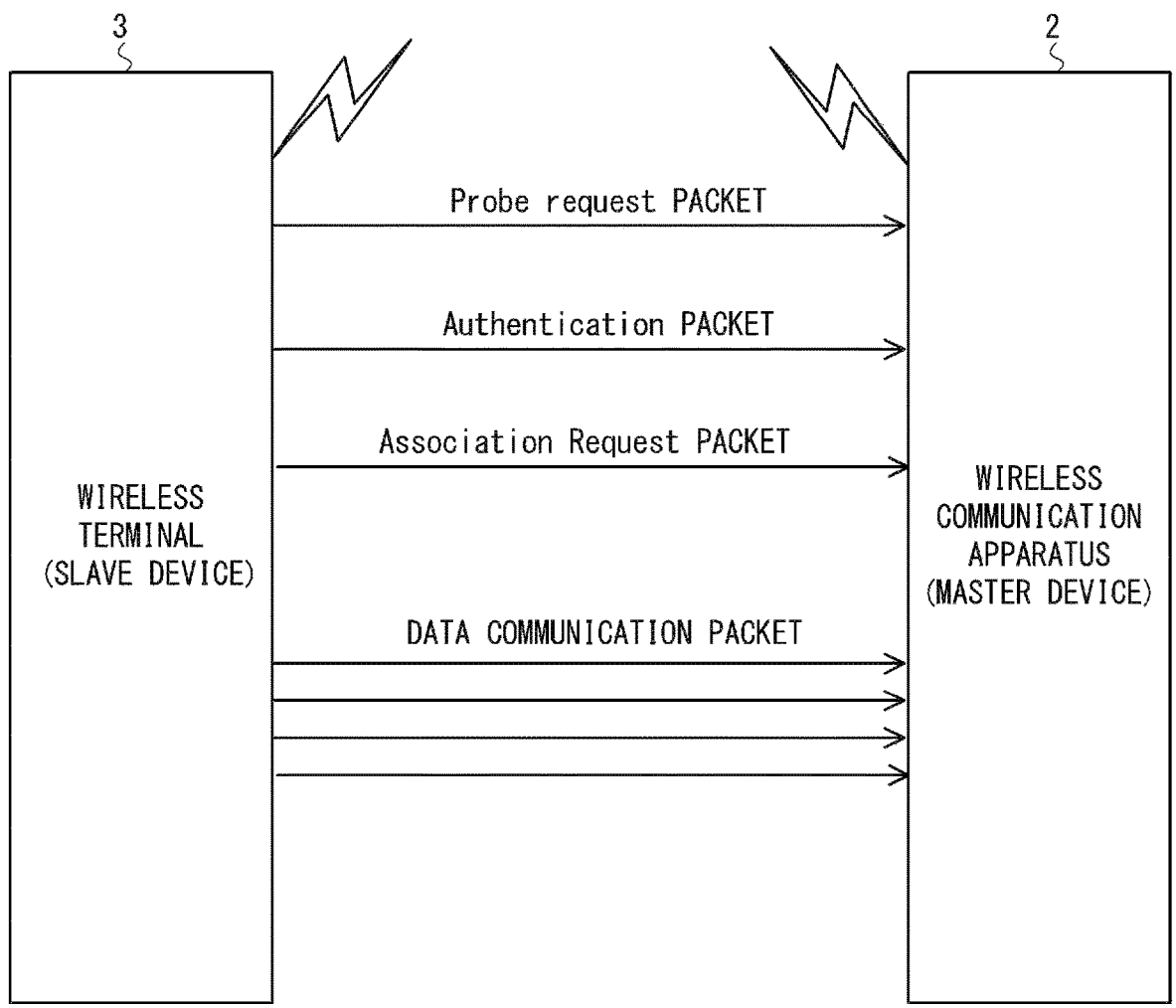
FIG. 3 is a schematic diagram showing a state where a wireless terminal as a slave device is wirelessly connected to a wireless communication apparatus as a master device.

FIG. 3 is a schematic diagram showing a state in which a wireless terminal 3, which is a slave device (a wireless LAN client), is wirelessly connected to the wireless communication apparatus 2, which is a master device. As shown in FIG. 3, the wireless communication apparatus 2 and the wireless terminal 3 establish wireless communication as follows. It is assumed that, in this example, the wireless communication apparatus 2 and the wireless terminal 3 perform wireless communication in accordance with the wireless communication standard IEEE 802.11. The wireless terminal 3, which is the slave device, transmits a probe request packet to the wireless communication apparatus 2, which is the master device. The probe request packet is for searching for a communicable access point. After that, the wireless terminal 3 transmits an authentication packet to the wireless communication apparatus 2. The authentication packet is for performing authentication. Next, the wireless terminal 3 transmits an association request packet to the wireless communication apparatus 2. The association request packet is for requesting a connection. When a series of these operations is successfully completed, the slave device camps on the master device. Then, data transmission/reception by data communication packets is performed.

The wired communication control unit 21 includes a LAN port (not shown) and the like and perform control for communication by a wired line. The storage unit 24 is, for example, a storage device such as a memory or a storage. The storage unit 24 stores information acquired by the information acquisition unit 25, which will be described later. The CPU 23 controls the entire operation of the wireless communication apparatus 2 by executing a program. With such a configuration, the wireless communication apparatus 2 achieves wireless LAN communication and wired communication such as a wired Internet connection.

Figure 4:
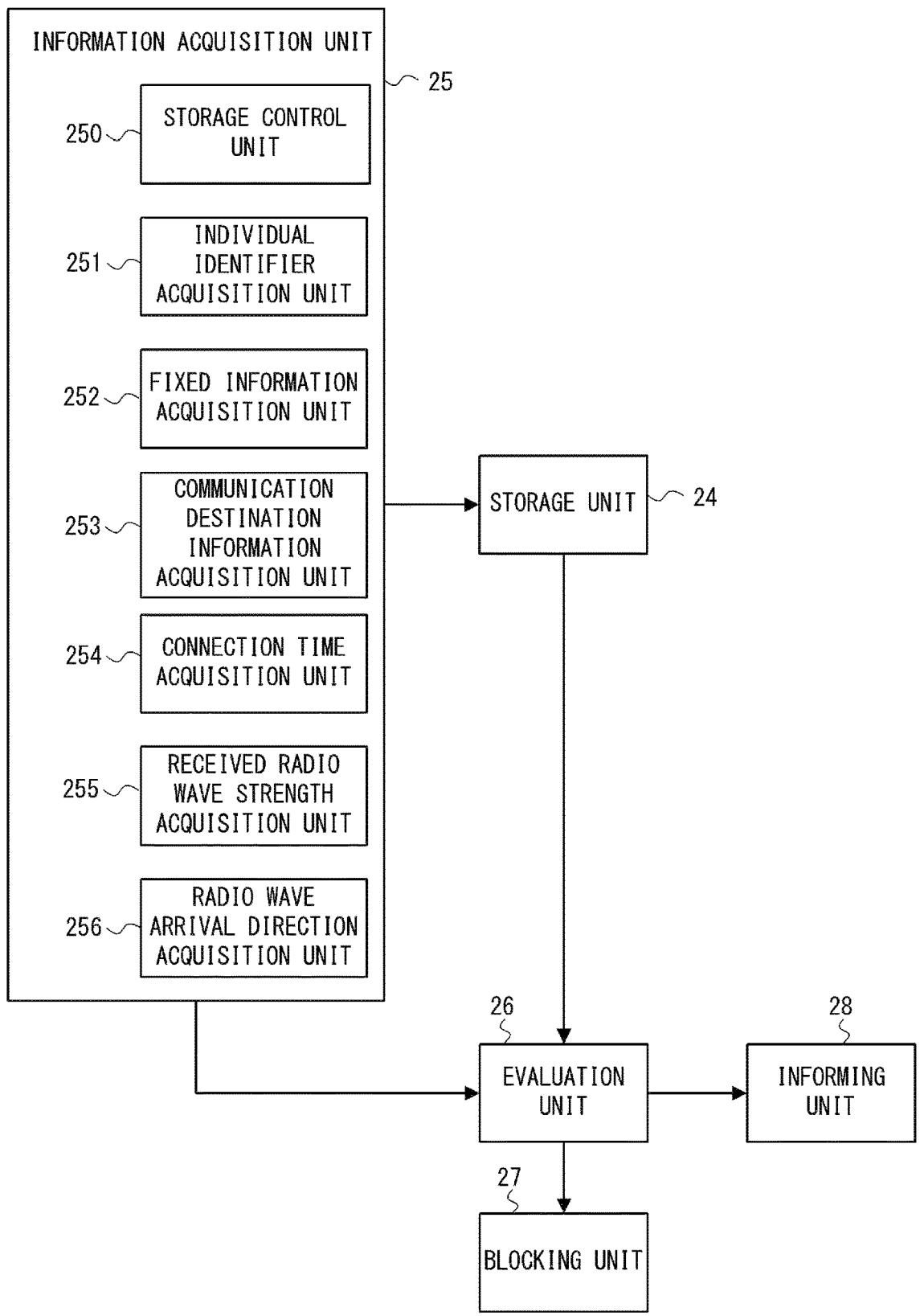
FIG. 4 is a functional block diagram of a wireless communication apparatus according to the first embodiment.

FIG. 4 is a functional block diagram of the wireless communication apparatus 2 according to the first embodiment. The wireless communication apparatus 2 includes an information acquisition unit 25, a storage unit 24, an evaluation unit 26, a blocking unit 27, and an informing unit 28. The information acquisition unit 25, the evaluation unit 26, the blocking unit 27, and the informing unit 28 can be implemented by, for example, executing programs under control of the CPU 23. More specifically, for example, these components are implemented by, for example, executing the programs stored in the storage unit 24 under the control of the CPU 23. Further, the respective components may not only be implemented by software including programs but also implemented by a combination of hardware, firmware, and software and the like.

The information acquisition unit 25 includes a storage control unit 250, an individual identifier acquisition unit 251, a fixed information acquisition unit 252, a communication destination information acquisition unit 253, a connection time acquisition unit 254, a received radio wave strength acquisition unit 255, and a radio wave arrival direction acquisition unit 256.

The storage control unit 250 performs control to store the acquired information in the storage unit 24. The storage unit 24 associates the information acquired by the information acquisition unit 25 with the MAC address, which is the individual identifier, and stores them in a management table. While the wireless communication apparatus 2 is set in an information accumulation state, the storage control unit 250 performs control to store the information acquired by the information acquisition unit 25 in the storage unit 24 as information about the authorized wireless terminal. In this way, the storage unit 24 stores the information about the authorized wireless terminal in association with the individual identifier of the authorized wireless terminal.

The individual identifier acquisition unit 251 acquires the individual identifier from packets transmitted from the wireless terminal 3, which is the slave device. In this embodiment, the individual identifier acquisition unit 251 extracts a transmission source MAC address from the packets transmitted from the wireless terminal 3. The storage control unit 250 checks as to whether or not the management table for the extracted MAC address has already been created in the storage unit 24. When the management table for the MAC address is already present, the storage control unit 250 stores, in the management table, the information acquired by the fixed information acquisition unit 252, the communication destination information acquisition unit 253, the connection time acquisition unit 254, the received radio wave strength acquisition unit 255, the radio wave arrival direction acquisition unit 256. On the other hand, when the management table for the MAC address is not present, the storage control unit 250 creates a new management table and places the created management table in a writable state. In this way, the information is stored in the management table for each MAC address.

Figure 5:
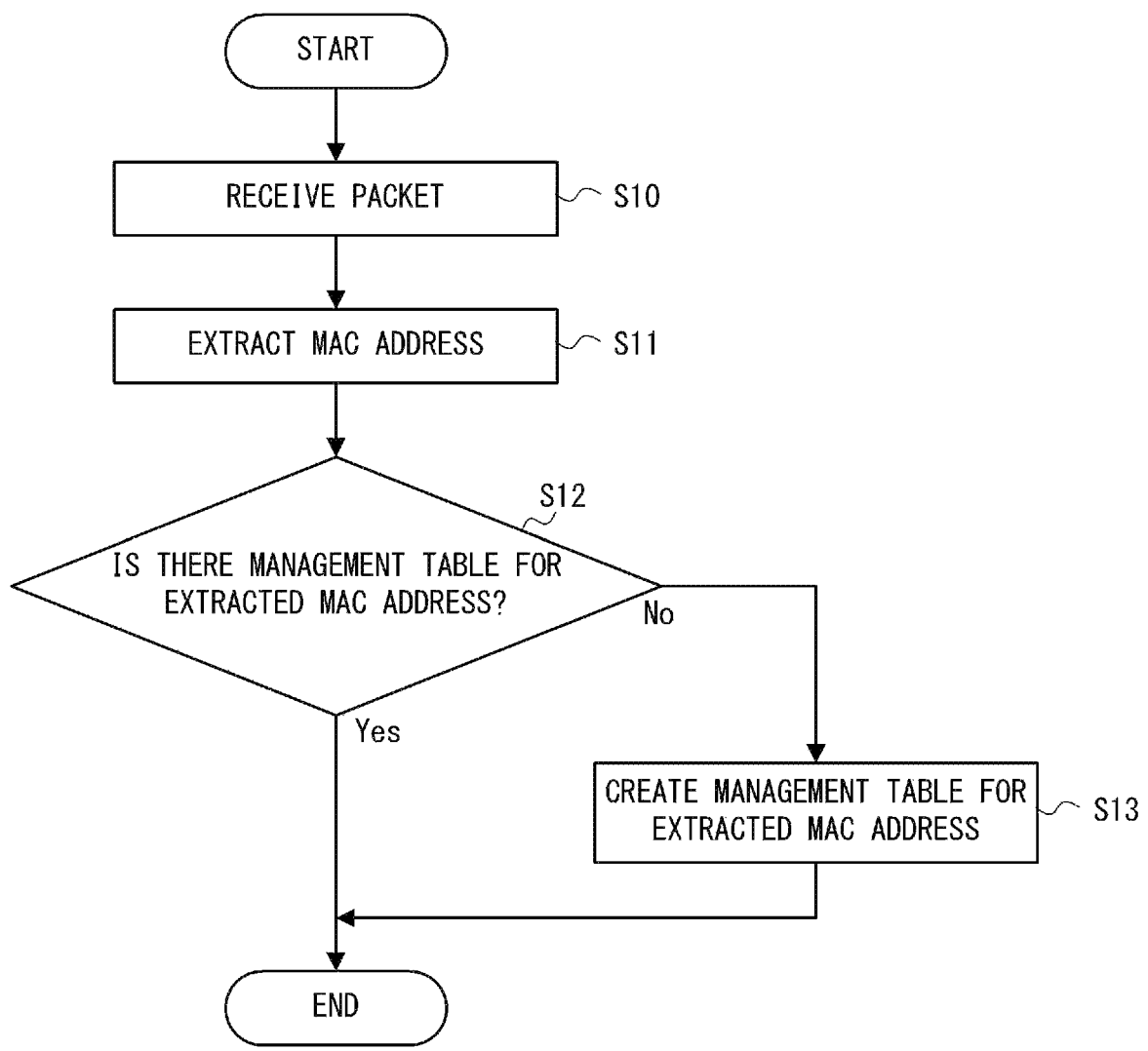
FIG. 5 is a flowchart showing an example of an operation for creating a management table.

FIG. 5 is a flowchart showing an example of an operation for creating the management table. When the wireless communication apparatus 2 receives the packets from the wireless terminal 3 (Step S10), the individual identifier acquisition unit 251 extracts the MAC address (Step S11). Then, the evaluation is made as to whether or not the management table for the extracted MAC address is already present (Step S12). When the management table is already present (Yes in Step S12), a new management table will not be created. On the other hand, when the management table is not present (No in Step S12), the storage control unit 250 creates a new management table (Step S13).

The fixed information acquisition unit 252 acquires the fixed information from the packets transmitted from the wireless terminal 3. In this embodiment, the fixed information is attached to the probe request packet transmitted from the wireless terminal 3. Specifically, the fixed information indicates a specification related to wireless communication attached to the probe request packet. For example, to the probe request packet, a communication standard supported by the slave device that has transmitted the probe request packet, setting values in the communication standard, information about a rate that can be used in communication, a supported security function, individual configuration information attached by each chip vendor, and the like are attached. The fixed information acquisition unit 252 extracts these parameters from the probe request packet. Note that, for example, IEEE 802.11n corresponds to the communication standard supported by the slave device that has transmitted the probe request packet. Further, if the communication standard supported by the slave device is IEEE 802.11n, the setting values in the communication standard are, for example, information indicating as to whether or not the communication in the 40 MHz width is possible, whether or not a short guard interval is possible, and whether or not beamforming is supported. The information about a rate that can be used in communication is a support rate the wireless terminal 3 can communicate at. The supported security function is, for example, information indicating as to whether or not WMM (WiFi Multimedia) is supported. The above-described pieces of information attached to the probe request are so-called invariable setting values that cannot be easily changed by an end user using the slave device.

The communication destination information acquisition unit 253 acquires communication destination information that is information indicating a communication destination of the wireless terminal 3, which is the slave device. The communication destination information acquisition unit 253 acquires communication destination information from the data communication packet transmitted from the wireless terminal 3 within a certain time after processing regarding the connection request from the wireless terminal 3 is completed and the wireless terminal 3, which is the slave device, camps on the wireless communication apparatus 2, which is the master device. In this embodiment, the communication destination information acquisition unit 253 acquires domain information of the communication destination (communication destination domain address).

The reason for acquiring the communication destination information is based on the following background. For example, a smartphone and the like may be configured as follows. A large-capacity file is not received, and an application is not updated via a mobile phone network. When the smartphone and the like is connected to a wireless LAN, a specific application is activated to automatically perform communication such as transmitting/receiving the large-capacity file and checking for an update of the application. The communication destination information is acquired in order to utilize such characteristics of the slave device as information for evaluating as to whether or not the slave device is authorized.

Figure 6:
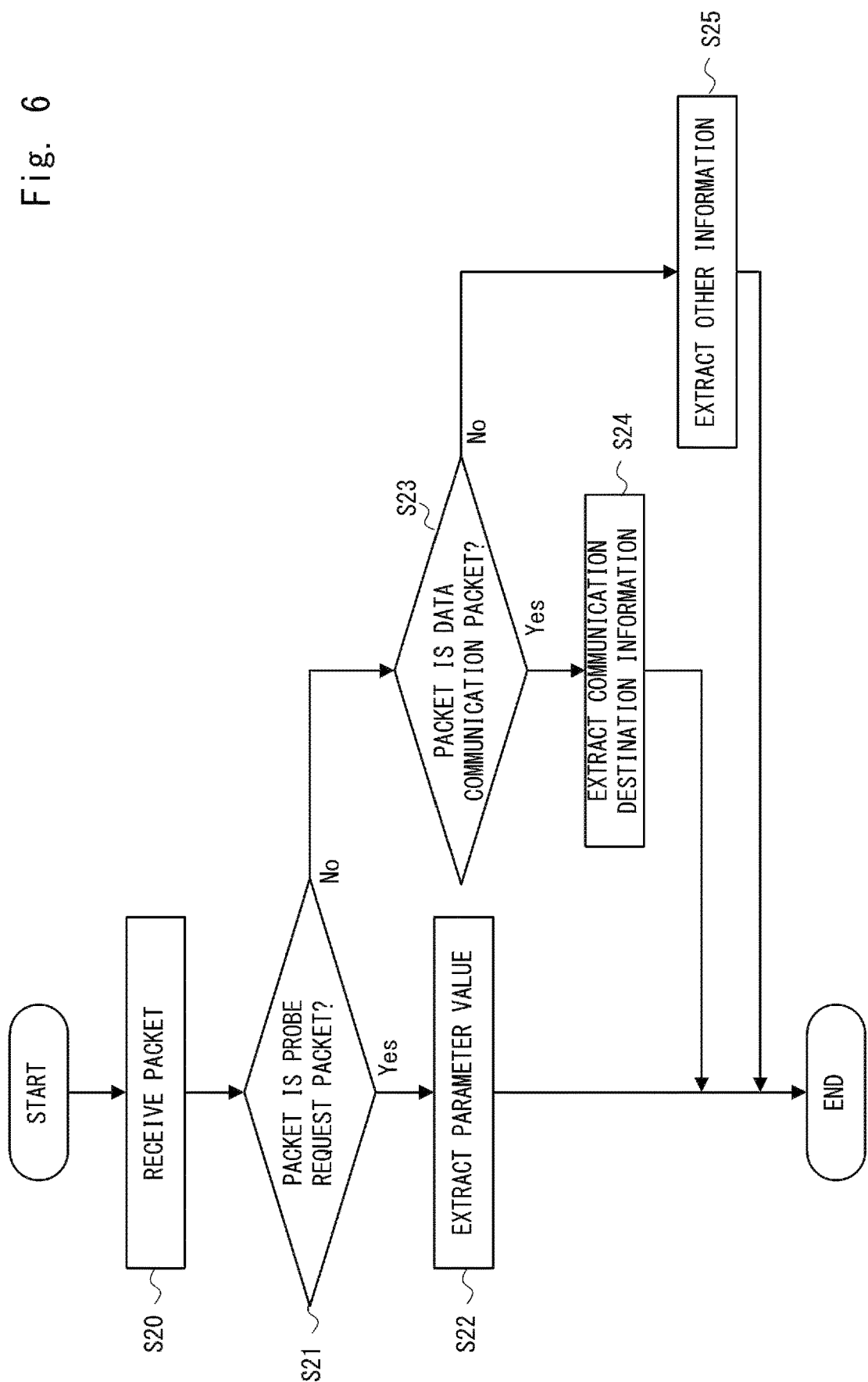
FIG. 6 is a flowchart showing an example of an information acquisition operation when a probe request packet or a data communication packet is received.

FIG. 6 is a flowchart showing an example of an information acquisition operation when the probe request packet or data communication packet is received.

When the wireless communication apparatus 2 receives a packet from the wireless terminal 3 (Step S20), an evaluation is made as to whether or not the received packet is the probe request packet (Step S21). When the received packet is the probe request packet (Yes in Step S21), the fixed information acquisition unit 252 extracts the parameter values attached to the probe request packet (Step S22). On the other hand, when the received packet is not the probe request packet (No in Step S21), an evaluation is made as to whether or not the received packet is the data communication packet (Step S23). When the received packet is the data communication packet (Yes in Step S23), the communication destination information acquisition unit 253 extracts the communication destination information from the data communication packet (Step S24). When the received packet is neither the probe request packet nor the data communication packet, the information acquisition unit 25 may not acquire any information. However, as shown in Step S25 in FIG. 6, when there is more information that is useful for identifying the characteristics of the slave device, the information acquisition unit 25 may acquire the information.

The connection time acquisition unit 254 acquires a connection time when the wireless terminal 3 is wirelessly connected to the wireless communication apparatus 2. Specifically, the connection time acquisition unit 254 acquires a received time of the packet transmitted from the wireless terminal 3, which is the slave device. The wireless communication apparatus 2 includes, for example, a timepiece (not shown) to acquire the time when the packet is received as the received time. The connection time acquisition unit 254 periodically acquires the time as long as the slave device continues the wireless connection. In this way, it is possible to record when the slave device is wirelessly connected from start to end in hours and minutes. Thus, the connection time zone of the slave device can be obtained.

When the connection time acquisition unit 254 acquires the connection time for each day of the week and manages the connection time zone per each of the week, the connection time zone of the slave device can be recorded for each day of the week. It is thus possible to recognize the characteristics of the slave device regarding the connection time zone in more detail.

The received radio wave strength acquisition unit 255 acquires the received radio wave strength (RSSI: Received Signal Strength Indicator) of the radio wave from the wireless terminal 3, which is the slave device. The received radio wave strength acquisition unit 255 acquires the received radio wave strength by calculating a numerical value of the received radio wave strength from a signal received from the wireless terminal 3. The received radio wave strength varies depending on an obstacle, a temperature, humidity, or other radio waves in a physical space where the slave device and master device are present. Therefore, it is desirable to acquire the received radio wave strength from a plurality of packets, not from only one packet, and calculates an average value of the received radio wave strength. The received radio wave strength acquisition unit 255 calculates the received radio wave strength from the packets transmitted from the wireless terminal 3 over a plurality of times until a certain time after data communication is started. This improves the accuracy of the received radio wave strength.

Figure 7:
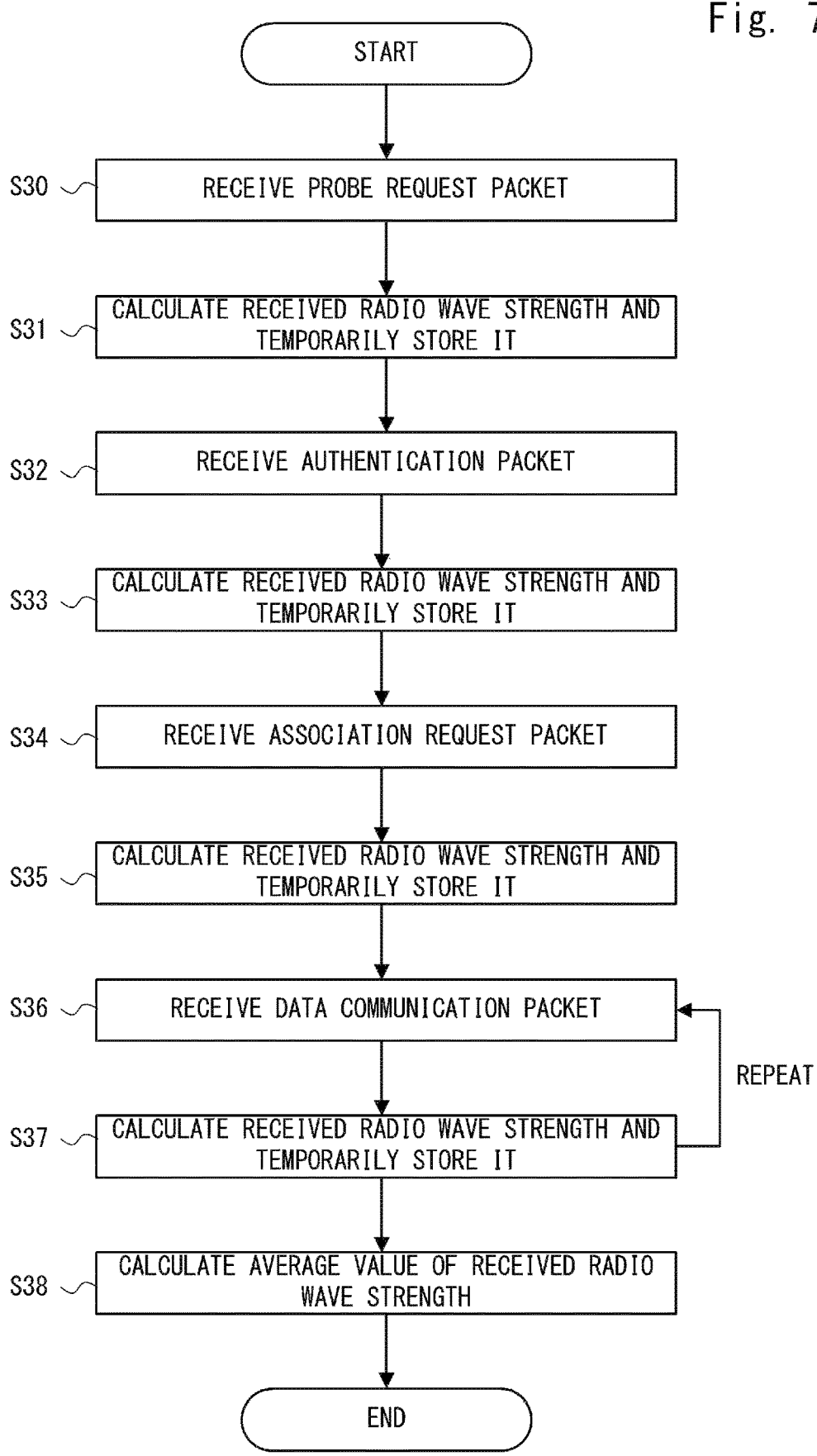
FIG. 7 is a flowchart showing an example of an operation for acquiring received radio wave strength.

FIG. 7 is a flowchart showing an example of an operation for acquiring the received radio wave strength. In Step S30, the wireless communication apparatus 2 receives the probe request packet from the wireless terminal 3. Then, in Step S31, the received radio wave strength acquisition unit 255 calculates the received radio wave strength based on the probe request packet and temporarily stores the calculated value in a memory or the like. Next, in Step S32, the wireless communication apparatus 2 receives an authentication packet from the wireless terminal 3. Then, in Step S33, the received radio wave strength acquisition unit 255 calculates the received radio wave strength based on the authentication packet and temporarily stores the calculated value. Next, in Step S34, the wireless communication apparatus 2 receives an association request packet from the wireless terminal 3. Then, in Step S35, the received radio wave strength acquisition unit 255 calculates the received radio wave strength based on the association request packet and temporarily stores the calculated value. After that, in Step S36, the wireless communication apparatus 2 receives the data communication packet from the wireless terminal 3. Then, in Step S37, the received radio wave strength acquisition unit 255 calculates the received radio wave strength based on the data communication packet and temporarily stores the calculated value. After the operations of Steps S36 and S37 are repeated, in Step S38, the received radio wave strength acquisition unit 255 calculates an average value of the received radio wave strength temporarily stored in Steps S31, S33, S35, and S37. The storage control unit 250 stores this average value in the management table.

The radio wave arrival direction acquisition unit 256 acquires an arrival direction of the radio waves from the wireless terminal 3 that has been wirelessly connected to the wireless communication apparatus 2. Thus, the direction in which the wireless terminal 3, which has been wirelessly connected, is present with respect to a position where the wireless communication apparatus 2 is present is obtained. Any known method can be incorporated as a method for acquiring the arrival direction of the radio waves. For example, the radio wave arrival direction acquisition unit 256 may detect the arrival direction of the radio waves from a signal received by an antenna constituting an array antenna. That is, the arrival direction may be calculated based on a difference in time when radio waves reach respective antenna elements of the array antenna. Further, for example, the RBF (Radial Basis Function) neural network, the MUSIC method (MUltiple SIgnal Classification method), or the like may be used for acquiring the arrival direction.

Like the received radio wave strength, the direction depends on the surrounding environment. For this reason, like the received radio wave strength, it is preferable that the data is calculated a plurality of times and the direction is determined from an average of the data in a series of sequences from connection start to data communication.

As described above, the information acquired by each component of the information acquisition unit 25 is stored in the management table for each MAC address in the storage unit 24, as shown in FIG. 8.

In such a series of processes from the connection to the data communication, the wireless communication apparatus 2 records various information pieces that can be acquired from the slave device every time there is access from the slave device. In this manner, the wireless communication apparatus 2 obtains the features of the authorized slave device.

When the number of accumulated information pieces, i.e., the number of times of access from the slave device, exceeds a predetermined number, the wireless communication apparatus 2, which is the master device, evaluates as to whether or not the slave device is an unauthorized device from the next connection by the slave device onward. That is, the evaluation unit 26 of the wireless communication apparatus 2 evaluates as to whether or not the slave device is a fake slave device whose MAC address is illegally rewritten, by comparing the information of the slave device to be evaluated with the information of the slave device that is stored in the storage unit 24. The details of the evaluation unit 26 will be described later.

First, the wireless communication apparatus 2 is set in the information accumulation state for accumulating the information about the authorized slave devices. Then, after a predetermined amount of the information is accumulated, the wireless communication apparatus 2 is switched to an unauthorization evaluation state. Note that the wireless communication apparatus 2 may notify an administrator or the like that the state has been switched to the unauthorization evaluation state by an e-mail or other methods or by turning on a lamp (not shown) that is provided on a surface of the wireless communication apparatus 2 or the like.

When the evaluation unit 26 evaluates that the slave device to be evaluated is an unauthorized slave device, the blocking unit 27 blocks the wireless connection with this slave device. Specifically, the blocking unit 27 transmits a disconnection request packet (de authentication) to the unauthorized slave device to block the wireless connection.

The informing unit 28 informs the administrator or the like of the occurrence of the wireless connection from the unauthorized slave device when the evaluation unit 26 evaluates that the slave device to be evaluated is the unauthorized slave device. For example, the informing unit 28 informs the administrator or the like via his/her contact information that is stored in advance in the wireless communication apparatus 2. The informing may be made by transmitting an e-mail or by transmitting information to a predetermined server. Further, when the wireless communication apparatus 2 includes a sound reproduction function, the informing unit 28 may inform the administrator or the like by sounding an alarm device. Furthermore, when the wireless communication apparatus 2 includes a display, the informing unit 28 may inform the administrator or the like by outputting information to be displayed on the display. Moreover, when the wireless communication apparatus 2 includes a lamp, the informing unit 28 may inform the administrator or the like by turning on the lamp.

Hereinafter, details of the unauthorized evaluation processing in the wireless communication apparatus 2 will be described.

The evaluation unit 26 first evaluates as to whether or not the individual identifier of the wireless terminal, which is the slave device to be evaluated, acquired by the individual identifier acquisition unit 251 is present in the management table of the storage unit 24. When the individual identifier of the slave device to be evaluated is not present in the management table, the evaluation unit 26 evaluates that the slave device is an unauthorized slave device. On the other hand, when the individual identifier of the slave device to be evaluated is present in the management table, the evaluation unit 26 evaluates as to whether the slave device is an authorized slave device or an unauthorized device with a spoofed individual identifier in the following manner.

The evaluation unit 26 evaluates whether or not the wireless terminal, which has been wirelessly connected to the wireless communication apparatus 2, is an authorized wireless terminal based on the degree of matching between the information, which is acquired by the information acquisition unit 25, about the wireless terminal that is the slave device to be evaluated and the information stored in the storage unit 24. Hereinafter, details of the evaluation processing of the evaluation unit 26 will be described. However, the evaluation method described below is an example, and the evaluation method is not limited to this.

In this embodiment, a plurality of kinds of information is acquired by the information acquisition unit 25. Thus, the evaluation unit 26 temporarily evaluates as to whether or not the wireless terminal to be evaluated is an authorized wireless terminal for each kind of information acquired by the information acquisition unit 25. Then, the evaluation unit 26 performs weighting on each temporal evaluation result to make a final evaluation.

First, the temporal evaluation based on the information acquired by the fixed information acquisition unit 252 will be described. The information acquired by the fixed information acquisition unit 252 is information of invariable values of the slave device. Thus, the evaluation unit 26 compares the fixed information of the slave device to be evaluated with the fixed information stored in the management table of the storage unit 24 and evaluates as to whether or not they exactly match. That is, when the fixed information of the slave device to be evaluated matches the fixed information of the storage unit 24 associated with the same individual identifier as that of this slave device, the evaluation unit 26 temporarily evaluates that the slave device to be evaluated is an authorized slave device. On the other hand, when the two pieces of information do not match, the evaluation unit 26 temporarily evaluates that the slave device to be evaluated is an unauthorized slave device.

Next, the temporal evaluation based on the information acquired by the communication destination information acquisition unit 253 will be described. The evaluation unit 26 makes the temporal evaluation based on the degree of matching between the communication destination information of the slave device to be evaluated and the communication destination information stored in the storage unit 24 that is associated with the same individual identifier as that of this slave device. Specifically, the evaluation unit 26 makes the temporal evaluation by comparing the communication destination information transmitted from the slave device within a certain time after the connection is completed with the past communication destination information stored in the management table of the storage unit 24. That is, the evaluation unit 26 compares the communication destination information of the slave device to be evaluated with the communication destination information of the storage unit 24 associated with the same individual identifier as that of this slave device and makes the temporal evaluation based on the degree of matching between the two pieces of the communication destination information. Specifically, when the degree of matching between the two pieces of the communication destination information is greater than a predetermined reference, the evaluation unit 26 temporarily evaluates that the slave device to be evaluated is an authorized slave device. On the other hand, when the degree of matching between the two pieces of the communication destination information is lower than the predetermined reference, the evaluation unit 26 temporarily evaluates that the slave device to be evaluated is an unauthorized slave device.

For example, the evaluation unit 26 makes the temporal evaluation based on the communication destination information as follows. The evaluation unit 26 checks as to whether or not each piece of the communication destination information extracted from the data communication packet transmitted from the slave device to be evaluated is described in the management table associated with the same individual identifier as that of this slave device. Then, the evaluation unit 26 compares the ratio of the number of communication destination information pieces described in the management table with the ratio of the number of communication destination information pieces not described in the management table. When the ratio of the number of the communication destination information pieces not described in the management table is greater than the ratio of the number of the communication destination information pieces described in the management table, the evaluation unit 26 temporarily evaluates that the slave device to be evaluated is an unauthorized slave device.

Figure 9:
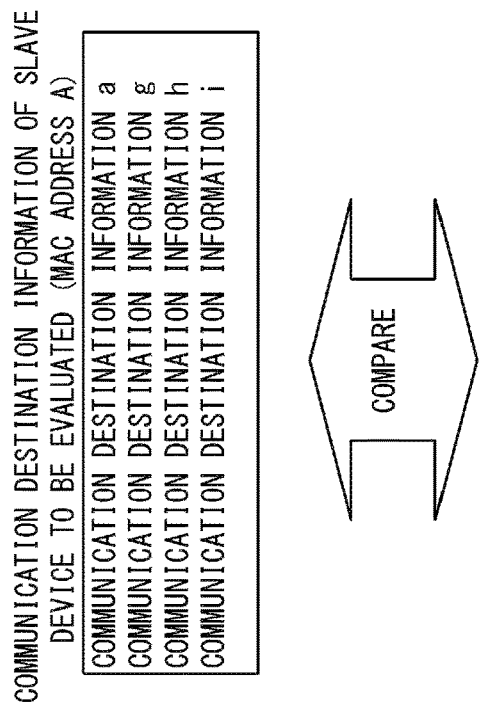
FIG. 9 is a diagram showing an example of communication destination information of a slave device to be evaluated and an example of the management table for the same individual identifier as that of the slave device to be evaluated.

This temporal evaluation by the evaluation unit 26 will be described with reference to a specific example. FIG. 9 is a diagram showing an example of the communication destination information of the slave device to be evaluated and an example of the management table for the same individual identifier as that of the slave device to be evaluated. In the example shown in FIG. 9, it is assumed that the individual identifier of the slave device to be evaluated is an MAC address A, and the communication destination information acquired from the packet transmitted by the slave device to be evaluated within the predetermined time is communication destination information a, g, h and i. It is also assumed that the following information is stored in the management table for the MAC address A stored in the storage unit 24. That is, communication destination information a, b, c, and d is stored as communication destination information associated with a connection time t1. Further, communication destination information a, c, e, and d is stored as communication destination information associated with a connection time t2. Moreover, communication destination information b, a, c, and e is stored as communication destination information associated with a connection time t3. Furthermore, communication destination information a, b, f, and d is stored as communication destination information associated with a connection time t4.

In this case, for example, among the communication destination information acquired from the packet transmitted by the slave device to be evaluated within the predetermined time, only the communication destination information a is described in the management table. The rest of the communication destination information g, h and i is not described in the management table. Therefore, the evaluation unit 26 temporarily evaluates that this slave device is an unauthorized slave device.

Note that, instead of the above ratio, the evaluation unit 26 may make the temporal evaluation based on the number of the communication destination information pieces acquired from the packet transmitted by the slave device to be evaluated within the predetermined time.

Next, the temporal evaluation based on the information acquired by the connection time acquisition unit 254 will be described. The evaluation unit 26 makes the temporal evaluation based on the degree of matching between the connection time of the slave device to be evaluated and the connection time stored in the storage unit 24 that is associated with the same individual identifier as that of this slave device. That is, when the degree of matching between the two connection times is greater than a predetermined reference, the evaluation unit 26 temporarily evaluates that the slave device to be evaluated is an authorized slave device. On the other hand, when the degree of matching between the two connection times is lower than the predetermined reference, the evaluation unit 26 temporarily evaluates that the slave device to be evaluated is an unauthorized slave device.

Figure 10:
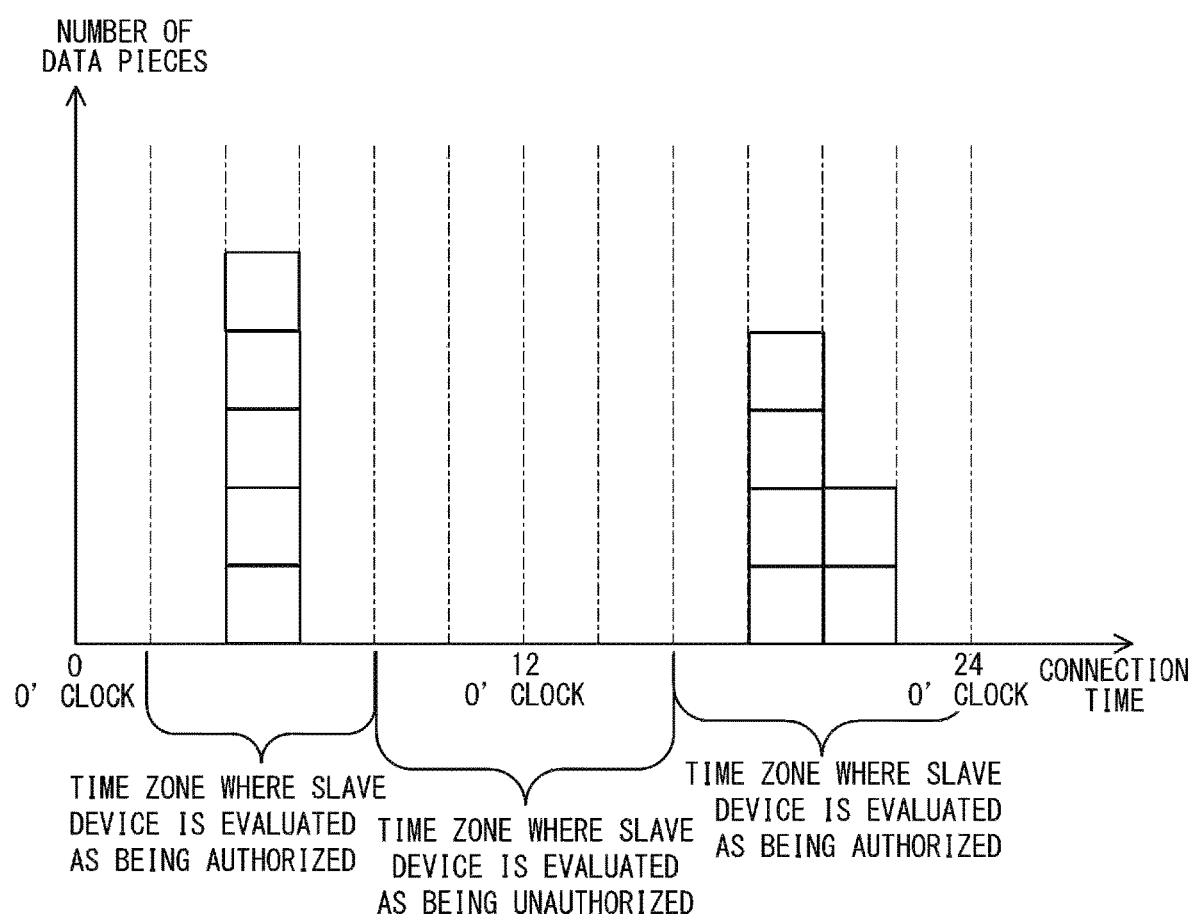
FIG. 10 is a graph schematically showing an example of a connection time stored in the storage unit.

A specific example of the temporal evaluation based on the connection time by the evaluation unit 26 will be described. FIG. 10 is a graph schematically showing an example of the connection time stored in the storage unit 24. In the graph shown in FIG. 10, the horizontal axis represents time, and the vertical axis represents the number of data pieces of the connection time stored in the storage unit 24 in association with the same individual identifier as that of the slave device to be evaluated. In FIG. 10, each rectangle represents one data piece at one connection time. The evaluation unit 26 divides the time axis into a time zone in which access from authorized slave devices is likely to occur and a time zone in which access from authorized slave devices is unlikely to occur. The evaluation unit 26 sets a time where there is a record of access from the authorized slave devices and a predetermined period before and after the time as a time zone when access from the authorized slave devices is likely to occur. When the access from the slave device to be evaluated occurs in this time zone, the evaluation unit 26 temporarily evaluates that the slave device is an authorized slave device. Further, when the access from the slave device to be evaluated occurs during a time zone other than this time zone, the evaluation unit 26 temporarily evaluates that the slave device is an unauthorized slave device. The reason why the predetermined period before and after the time where there is a record of access from the authorized slave devices is included in the time zone when access from the authorized slave devices is likely to occur is that there may be access from the authorized slave device at a time slightly different from past connection times.

Next, the temporal evaluation based on the information acquired by the radio wave arrival direction acquisition unit 256 will be described. The evaluation unit 26 makes the temporal evaluation based on the degree of matching between the radio wave arrival direction of the slave device to be evaluated and the radio wave arrival direction stored in the storage unit 24 that is associated with the same individual identifier as that of this slave device. That is, when the degree of matching between the two radio wave arrival directions is greater than a predetermined reference, the evaluation unit 26 temporarily evaluates that the slave device to be evaluated is an authorized slave device. On the other hand, when the degree of matching between the two radio wave arrival directions is lower than the predetermined reference, the evaluation unit 26 temporarily evaluates that the slave device to be evaluated is an unauthorized slave device. To be specific, like the temporal evaluation based on the connection times, the evaluation unit 26 makes the temporal evaluation based on the radio wave arrival direction. Specifically, instead of the time axis shown in FIG. 10, by using an axis representing the direction, the temporal evaluation is made by dividing the axis into a direction zone in which the wireless connection is evaluated that it is from the authorized slave device and a direction zone in which the wireless connection is evaluated that it is from the unauthorized slave device.

Next, the temporal evaluation based on the information acquired by the received radio wave strength acquisition unit 255 will be described. The evaluation unit 26 makes the temporal evaluation based on the degree of matching between the received radio wave strength of the slave device to be evaluated and the received radio wave strength stored in the storage unit 24 that is associated with the same individual identifier as that of this slave device. Here, in particular, the evaluation unit 26 makes the evaluation by comparing a predetermined reference, which is calculated from a distribution of the received radio wave strength stored in the storage unit 24 in association with the same individual identifier as that of the individual identifier of the slave device to be evaluated, with the received radio wave strength of this slave device to be evaluated.

Figure 11:
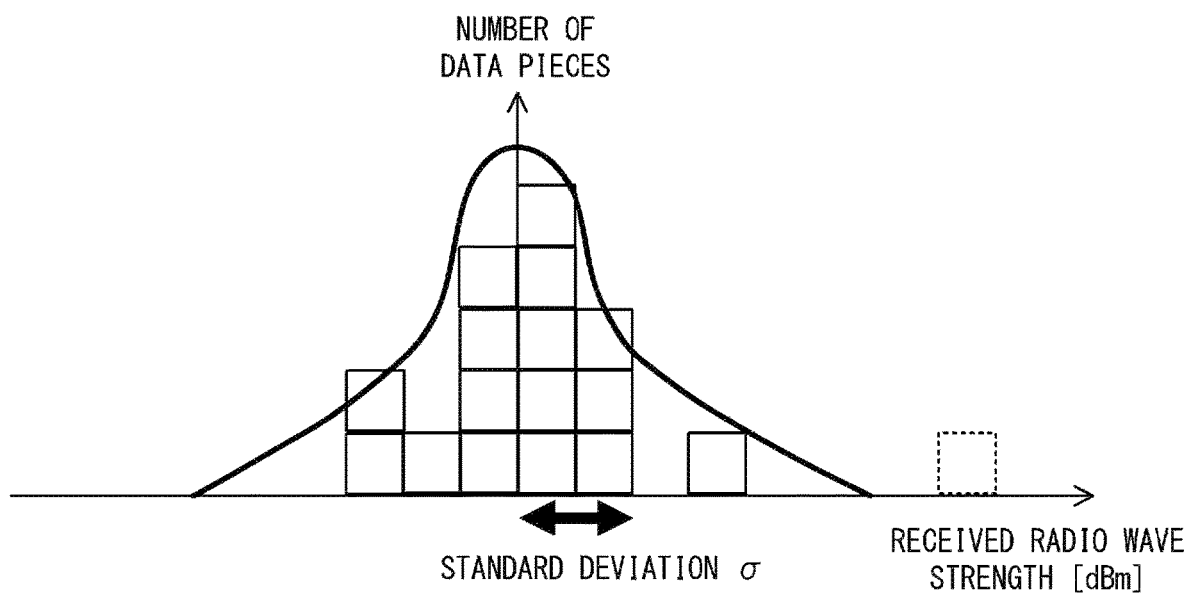
FIG. 11 is a graph showing an example of a distribution of received radio wave strength.

When the received radio wave strength is compared, it is assumed that the authorized slave device attempts to establish a connection from a certain place in some degree. Thus, the distribution of the received radio wave strength will become a normal distribution as shown in FIG. 11. FIG. 11 is a graph showing an example of the distribution of received radio wave strength. In FIG. 11, the horizontal axis represents the received radio wave strength and the vertical axis represents the number of data pieces of the received radio wave strength of the slave device having a certain individual identifier. In FIG. 11, each rectangle represents one piece of data of the received radio wave strength. In FIG. 11, rectangles drawn by solid lines represent examples of data of the received radio wave strength of the authorized slave device, and a rectangle drawn by a broken line represents an example of data of the received radio wave strength of the unauthorized slave device.

The reason why the connection of the authorized slave device is from a certain place in some degree is that, for example, the wireless communication apparatus 2 (e.g., a router) used in a standard home or the like is installed in a fixed place somewhere in a house, and the slave device accesses the master device somewhere in a room in the house. Thus, the usage environment such as a distance between the master device and the slave device and the surrounding obstacles are almost constant.

In this embodiment, the evaluation unit 26 uses a standard deviation $\sigma$ of a distribution as the predetermined reference value that is calculated from the distribution of the received radio wave strength stored in the storage unit 24 in association with the same individual identifier as the individual identifier of the slave device to be evaluated. Specifically, when there is access from the slave device having the received radio wave strength exceeding a predetermined multiple of the standard deviation $\sigma$ (see the rectangle of the broken line shown in FIG. 11), the evaluation unit 26 temporarily evaluates that the slave device is an unauthorized slave device. On the other hand, the evaluation unit 26 temporarily evaluates that the slave device having the received radio wave strength within the predetermined multiple of the standard deviation $\sigma$ is an authorized slave device.

As described above, the evaluation unit 26 makes the temporal evaluation based on the fixed information, the temporal evaluation based on the communication destination information, temporal evaluation based on the connection time, the temporal evaluation based on the radio wave arrival direction, and the temporal evaluation based on the received radio wave strength. Next, the evaluation unit 26 performs weighting on these evaluation results, and makes a final evaluation as to whether the slave device to be evaluated is an authorized slave device or an unauthorized slave device.

FIG. 12 is a table showing an example of a final evaluation method performed by the evaluation unit 26. For example, as shown in FIG. 12, the evaluation unit 26 quantifies the temporal evaluation results. More specifically, in the example shown in FIG. 12, when the temporal evaluation result indicates the unauthorized slave device, a numerical value is set to 1, while when the temporal evaluation result indicates the authorized slave device, the numerical value is set to 0. In the example shown in FIG. 12, weighting in three stages is set. Specifically, weighting heavy is set for the temporal evaluation result based on the fixed information, and weighting medium is set for the temporal evaluation result based the communication destination information and the temporal evaluation result based on the connection time, and weighting light is set for the temporal evaluation result based on the received radio wave strength and the temporal evaluation result based on the radio wave arrival direction. In the example shown in FIG. 12, the evaluation unit 26 multiplies the numerical value of the temporal evaluation result by 3 when the weighting heavy is set, and multiplies the numerical value of the temporal evaluation result by 2 when weighting medium is set, and multiplies the numerical value of the temporal evaluation result by 1 when weighting light is set. Then, the evaluation unit 26 calculates the sum of these multiplication results (in the example shown in FIG. 12, the sum is 7), and checks as to whether or not the calculation result exceeds a predetermined threshold. When the calculation result exceeds the predetermined threshold, the evaluation unit 26 makes the final evaluation such that the slave device to be evaluated is unauthorized. When the calculation result does not exceed the predetermined threshold, the evaluation unit 26 makes the final evaluation such that the slave device to be evaluated is authorized. Note that the multiplication value of the weighting shown in FIG. 12 is an example, and other multiplication values may be used.

Figure 13:
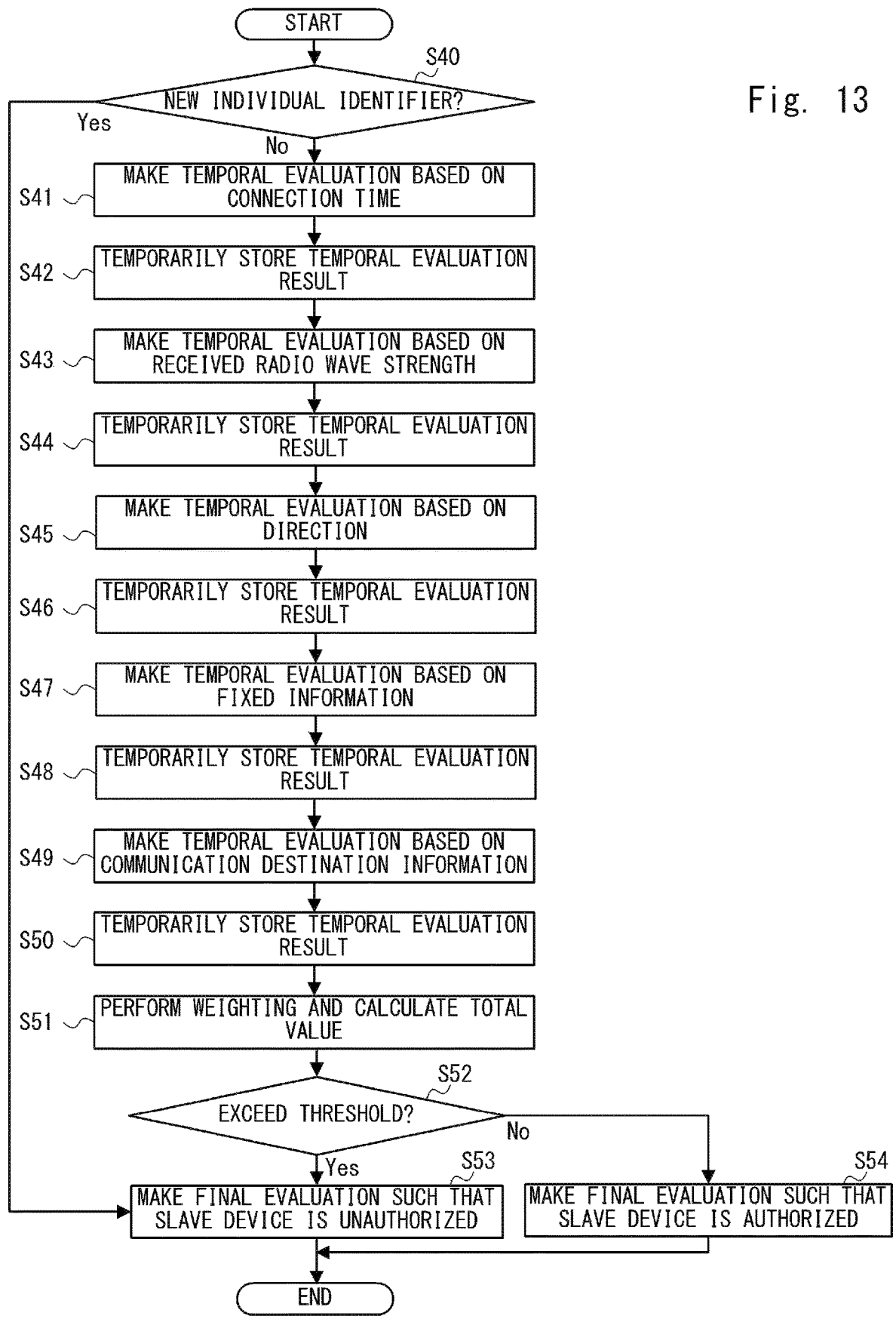
FIG. 13 is a flowchart showing an example of an evaluation operation by the evaluation unit according to the first embodiment.

FIG. 13 is a flowchart showing an example of the evaluation operation performed by the evaluation unit 26 according to the first embodiment.

In Step S40, the evaluation unit 26 evaluates as to whether or not the individual identifier of the slave device to be evaluated acquired by the individual identifier acquisition unit 251 is a new individual identifier that is not stored in the storage unit 24. When the individual identifier of the slave device to be evaluated acquired by the individual identifier acquisition unit 251 is a new individual identifier (Yes in Step S40), the process proceeds to Step S53. In Step S53, the evaluation unit 26 makes the final evaluation such that a wireless connection is from an unauthorized slave device. On the other hand, when the individual identifier of the slave device to be evaluated acquired by the individual identifier acquisition unit 251 is not a new individual identifier (No in Step S40), the process proceeds to Step S41. From Step S41 onward, the evaluation unit 26 evaluates as to whether or not the slave device to be evaluated is a slave device with a spoofed individual identifier.

In Step S41, the evaluation unit 26 makes the temporal evaluation based on the connection time. In Step S42, the temporal evaluation result based on the connection time is temporarily stored in a memory or the like. Next, in Step S43, the evaluation unit 26 makes the temporal evaluation based on the received radio wave strength. In Step S44, the temporal evaluation result based on the received radio wave strength is temporarily stored. Next, in Step S45, the evaluation unit 26 makes the temporal evaluation based on the radio wave arrival direction. In Step S46, the temporal evaluation result based on the radio wave arrival direction is temporarily stored. Next, in Step S47, the evaluation unit 26 makes the temporal evaluation based on the fixed information. In Step S48, the temporal evaluation result based on the fixed information is temporarily stored. Next, in Step S49, the evaluation unit 26 makes the temporal evaluation based on the communication destination information. In Step S50, the temporal evaluation result based on the communication destination information is temporarily stored.

It is obvious that the order of the temporal evaluation may not be the order shown in FIG. 13. Additionally, each of the temporal evaluation may be performed in parallel.

In Step S51, the evaluation unit 26 quantifies each of the temporal evaluation results, performs the above-described weighting, and calculates a total value.

In Step S52, the evaluation unit 26 evaluates as to whether or not the total value calculated in Step S51 exceeds a predetermined threshold. When the total value exceeds the predetermined threshold (Yes in Step S52), the evaluation unit 26 makes the final evaluation such that the slave device to be evaluated is an unauthorized slave device with a spoofed individual identifier (Step S53). On the other hand, when the total value does not exceed the predetermined threshold (No in Step S52), the evaluation unit 26 makes the final evaluation such that the slave device to be evaluated is an authorized slave device (Step S54). When the final evaluation is made such that the slave device is an authorized slave device, the information acquired by the information acquisition unit 25 for this slave device may be stored in the management table.

The first embodiment has been described above.

Incidentally, as a method for preventing a wireless connection from the unauthorized slave device, for example, there are the following three methods. However, each of the methods has a drawback, as described later.

A first method is a method for preventing a wireless connection from the unauthorized slave device by encrypting wireless connections and communication with the master device. With this technique, an encryption key is required for the wireless connections. Thus, it is impossible for the slave device to camp on the target master device unless the encryption key is known.

In a second method, the master device stores, in a list, the MAC addresses of the slave devices that are allowed for wireless connections, and only the slave devices having the MAC addresses on the list are allowed to establish wireless connections. With this method, it is possible to refuse a connection with a slave device that is not on the list.

A third method is a method for automatically performing connection authentication using the encryption key when a button provided on a surface of a housing of the master device and a button provided on the slave device are pressed within the same time zone. With this method, a user who has the slave device attempting to establish a wireless connection needs to be at a distance physically close to the master device so that he/she can pick up the master device. It is thus possible to prevent wireless connections from someone other than a person who is around the master device.

However, the above three methods each have a drawback.

The first method has the following drawback. When the encryption key of the master device is a simple key that is easy to decipher or is a word described in a dictionary, an attacker with an unauthorized slave device can find the encryption key by brute force attack of character strings, dictionary attack, or the like. Further, even when strong encryption algorithms are used, there is risk that the encryption could be decrypted because of recent advances in decryption technology.

The second method has the following drawback. As the slave devices allowed for wireless connections are managed only by the MAC addresses, the attacker can spoof the MAC address by writing the same MAC address as the MAC address on the list in its own slave device in order to establish a wireless connection with the unauthorized slave device.

The third method has the following drawback. The third method is originally a function included in order to eliminate time and effort for manually setting, in a slave device, profile information (SSID (Service Set Identifier), an encryption mode, and an encryption key) of the master device with which a wireless connection is to be established. Thus, the master device does not protect against unauthorized connections from the slave devices or make selection as to whether or not a connection is an unauthorized connection. For this reason, the third method is not a sufficient solution in terms of security.

On the other hand, according to the wireless communication apparatus 2 of the first embodiment, even when a malicious user sneaks through the above drawbacks and spoofs the individual identifier of the slave device to attempt to establish a connection with the wireless communication apparatus, it is possible to detect the connection as unauthorized access. Moreover, unauthorized access can be detected when authentication is not set, when an encryption key is not set in communication, or when the encryption key is identified.

Second Embodiment

Next, a second embodiment will be described. In the first embodiment, while the wireless communication apparatus 2 is set in the unauthorization evaluation state, when a new slave device, which has no wireless connection history, is wirelessly connected to the wireless communication apparatus 2 (Yes in Step S40 of FIG. 13), the wireless connection is evaluated as a wireless connection from an unauthorized slave device. In this embodiment, in addition to the processing of the wireless communication apparatus 2 according to the first embodiment, processing is performed to evaluate as to whether or not such a new slave device is an authorized slave device.

In a case of a router or the like in a standard home, even if it is a wireless connection from a new slave device, when the user is the same as before, the connection time zone, the radio wave arrival direction, the received radio wave strength, and the like are the same as those of another device in some degree. Therefore, when a wireless connection from a new slave device having no wireless connection history occurs while the wireless communication apparatus 2 is set in the unauthorization evaluation state, the wireless communication apparatus 2 according to the second embodiment aggregates the information of the slave devices stored in the storage unit 24 and evaluates as to whether or not this new slave device is an authorized device or an unauthorized device based on the aggregated information.

That is, when the information associated with the individual identifier of the slave device to be evaluated is not stored in the storage unit 24, the evaluation unit 26 according to this embodiment evaluates as to whether the slave device is an unauthorized slave device or an authorized slave device based on the degrees of matching between the connection time, the received radio wave strength, and the radio wave arrival direction stored in the storage unit 24 and the connection time, the received radio wave strength, and the radio wave arrival direction of the slave device to be evaluated, respectively. In this embodiment, the evaluation is made based on the degrees of matching between all of the connection time, the received radio wave strength, and the radio wave arrival direction. However, it is not always necessary to make the evaluation based on all of the degrees of matching. That is, the information acquisition unit 25 may acquire any one of the information of the connection time, the received radio wave strength, and the arrival direction, and the evaluation unit 26 may make the evaluation based on the degree of matching based on the information acquired by the information acquisition unit 25.

Figure 14:
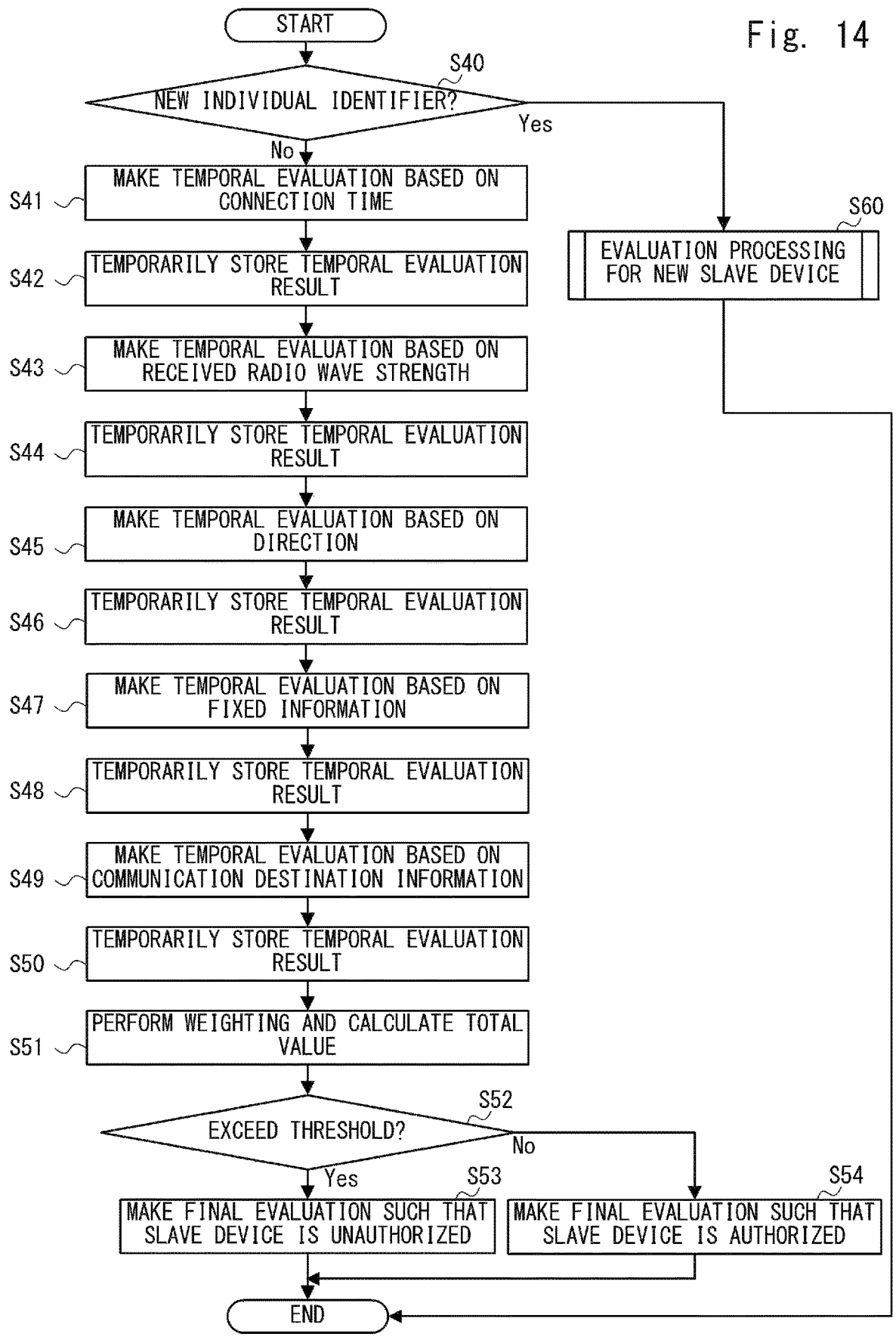
FIG. 14 is a flowchart showing an example of an evaluation operation by an evaluation unit according to a second embodiment.
Figure 15:
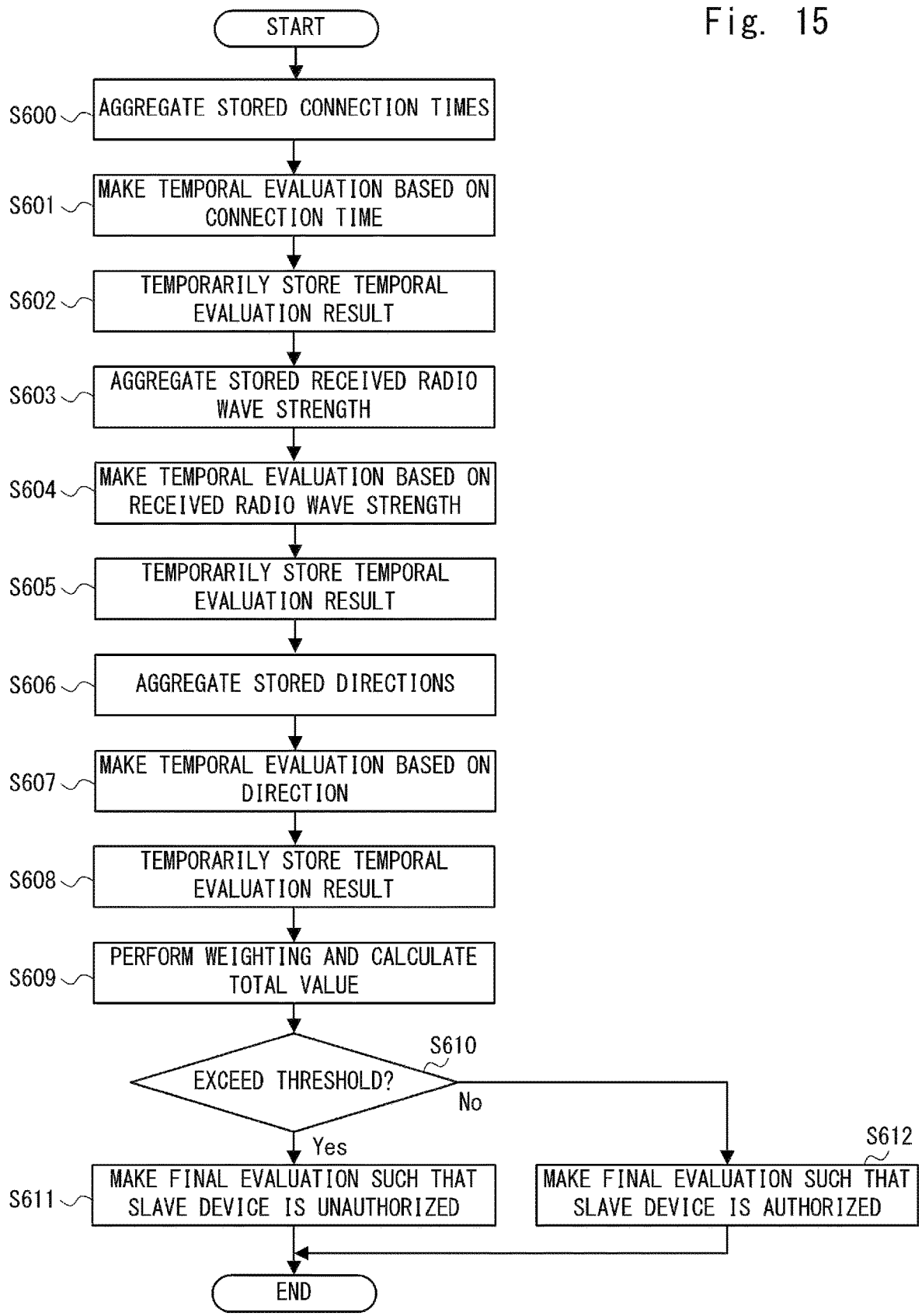
FIG. 15 is a flowchart showing details of evaluation processing for a new slave device shown in FIG. 14.

FIG. 14 is a flowchart illustrating an example of the evaluation operation performed by the evaluation unit 26 according to the second embodiment. FIG. 15 is a flowchart showing details of the evaluation processing for the new slave device shown in FIG. 14. Hereinafter, the process of the evaluation unit 26 according to the second embodiment will be described with reference to FIGS. 14 and 15.

In the flowchart shown in FIG. 13, when a new slave device having no wireless connection history is wirelessly connected to the wireless communication apparatus 2 (Yes in Step S40), it is evaluated that the wireless connection is from an unauthorized slave device (Step S53). However, in the flowchart shown in FIG. 14, when a new slave device having no wireless connection history attempts to establish a wireless connection with the wireless communication apparatus 2 (Yes in Step S40), the process proceeds to Step S60. In Step S60, the evaluation processing for the new slave device is performed.

Hereinafter, details of the evaluation processing (Step S60) for the new slave device performed by the evaluation unit 26 will be described with reference to FIG. 15.

In Step S600, the evaluation unit 26 aggregates all the connection times stored in the storage unit 24. Note that the individual identifiers associated with the aggregated connection times are different from the individual identifier of the new slave device to be evaluated.

Next, in Step S601, the evaluation unit 26 makes the temporal evaluation as to whether this slave device is an authorized slave device or an unauthorized slave device based on the degree of matching between the connection times aggregated in Step S600 and the connection time of the new slave device to be evaluated. The temporal evaluation in Step S601 differs from the temporal evaluation in the above-described Step S41 in the following point. Specifically, in Step S41, the temporal evaluation is made by comparing the connection time corresponding to the individual identifier of the slave device to be evaluated with the connection time of the new slave device to be evaluated. The temporal evaluation in Step S601 is the same as the temporal evaluation in Step S41 except for this point.

When the temporal evaluation in Step S601 is completed, in Step S602, the evaluation unit 26 temporarily stores the temporal evaluation result based on the connection time.

Next, in Step S603, the evaluation unit 26 aggregates all received radio wave strength stored in the storage unit 24. Note that the individual identifiers associated with the received radio wave strength to be aggregated are different from the individual identifier of the new slave device to be evaluated.

Next, in Step S604, the evaluation unit 26 makes the temporal evaluation as to whether this new slave device is an authorized slave or an unauthorized slave device based on the degree of matching between the received radio wave strength aggregated in Step S603 and the received radio wave strength of this new slave device to be evaluated. The temporal evaluation in Step S604 differs from the temporal evaluation in the above-described Step S43 in the following point. Specifically, in Step S43, the temporal evaluation is made by comparing the received radio wave strength corresponding to the individual identifier of the slave device to be evaluated with the received radio wave strength of the new slave device to be evaluated. The temporal evaluation in Step S604 is the same as the temporal evaluation in Step S43 except for this point.

When the temporal evaluation in Step S604 is completed, in Step S605, the evaluation unit 26 temporarily stores the temporal evaluation result based on the received radio wave strength.

Next, in Step S606, the evaluation unit 26 aggregates all radio wave arrival directions stored in the storage unit 24. Note that the individual identifiers associated with the radio wave arrival directions to be aggregated are different from the individual identifier of the new slave device to be evaluated.

Next, in Step S607, the evaluation unit 26 makes the temporal evaluation as to whether the slave device is an authorized slave or an unauthorized slave device based on the degree of matching between the radio wave arrival directions aggregated in Step S606 and the radio wave arrival direction of the new slave device to be evaluated. The temporal evaluation in Step S607 differs from the temporal evaluation in the above-described Step S45 in the following point. Specifically, in Step S45, the temporal evaluation is made by comparing the radio wave arrival direction corresponding to the individual identifier of the slave device to be evaluated with the radio wave arrival direction of the new slave device to be evaluated. The temporal evaluation in Step S607 is the same as the temporal evaluation in Step S45 except for this point.

When the temporal evaluation in Step S607 is completed, in Step S608, the evaluation unit 26 temporarily stores the temporal evaluation result based on the radio wave arrival direction.

It is obvious that the order of the temporal evaluation may not be the order shown in FIG. 15. Additionally, each of the temporal evaluation may be performed in parallel.

Next, in Step S609, like in Step S51, the evaluation unit 26 quantifies each of the temporal evaluation results, performs the above-described weighting, and calculates a total value.

Next, in Step S610, the evaluation unit 26 evaluates as to whether or not the total value calculated in Step S609 exceeds a predetermined threshold. When the total value exceeds the predetermined threshold (Yes in Step S610), the evaluation unit 26 makes the final evaluation such that the slave device to be evaluated is an unauthorized slave device (Step S611). On the other hand, when the total value does not exceed the predetermined threshold (No in Step S610), the evaluation unit 26 makes the final evaluation such that the slave device to be evaluated is an authorized slave device (Step S612). When the final evaluation is made such that the slave device is an authorized slave device, the information acquired by the information acquisition unit 25 for this slave device may be stored in the management table.

According to this embodiment, it is further possible to evaluate whether a new slave device having no connection history is an authorized slave device or an unauthorized slave device.

Third Embodiment

Next, a third embodiment will be described. In the above-described embodiments, when the wireless communication apparatus 2 is set in the information accumulation state, the evaluation by the evaluation unit 26 is not performed. That is, in the above-described embodiments, the state of the wireless communication apparatus 2 is divided into the information accumulation state and the unauthorization evaluation state. This embodiment differs from the above embodiments in that the evaluation processing is executed without distinguishing between such states.

The evaluation unit 26 according to this embodiment adds, to the evaluation condition, various information pieces acquired by the information acquisition unit 25 in order from the information that is evaluated to be usable for the unauthorization evaluation. For example, since the evaluation based on the fixed information is made as to whether or not the two fixed information pieces exactly match, it is not necessary to aggregate a plurality of the fixed information pieces for one individual identifier. Therefore, once the fixed information is acquired, it is possible to make the evaluation based on the fixed information. Accordingly, for a second wireless connection from the slave device having the individual identifier whose fixed information is already acquired, the evaluation unit 26 can perform the unauthorization evaluation based only on the fixed information. Regarding the communication destination information, for example, when information is collected from 100 or more wireless connection, the evaluation unit 26 determines that the accuracy of the information is sufficient and adds the communication destination information to an evaluation logic of the unauthorization evaluation. Regarding the received radio wave strength, the radio wave arrival direction, and the connection time, for example, when information is collected from 1000 or more wireless connection, the evaluation unit 26 determines that the accuracy of the information is sufficient and adds the communication destination information to the evaluation logic of the unauthorization evaluation. In this manner, the evaluation unit 26 changes the timing used as the criterion for unauthorization evaluation according to the nature of the type of information acquired by the information acquisition unit 25. It is obvious that the above 100 and 1000 are examples. That is, the threshold of the number of data pieces for adding various kinds of information to the evaluation logic may be a predetermined number.

Specifically, for example, the evaluation unit 26 according to this embodiment makes the evaluation based on the fixed information until the number of data pieces of the communication destination information, which is associated with the same individual identifier as that of the slave device to be evaluated and is stored in the storage unit 24, reaches a predetermined first number. After the number of data pieces reaches the first number, the evaluation unit 26 makes the evaluation based on the fixed information and the communication destination information.

Likewise, for example, the evaluation unit 26 according to this embodiment makes the evaluation based on the fixed information until the number of data pieces of the connection time, which is associated with the same individual identifier as that of the slave device to be evaluated and is stored in the storage unit 24, reaches a predetermined second number. After the number of data pieces reaches the second number, the evaluation unit 26 makes the evaluation based on the fixed information and the connection time.

Likewise, for example, the evaluation unit 26 according to this embodiment makes the evaluation based on the fixed information until the number of data pieces of the received radio wave strength, which is associated with the same individual identifier as that of the slave device to be evaluated and is stored in the storage unit 24, reaches a predetermined third number. After the number of data pieces reaches the third number, the evaluation unit 26 makes the evaluation based on the fixed information and the received radio wave strength.

Likewise, for example, the evaluation unit 26 according to this embodiment makes the evaluation based on the fixed information until the number of data pieces of the arrival direction, which is associated with the same individual identifier as that of the slave device to be evaluated and is stored in the storage unit 24, reaches a predetermined fourth number. After the number of data pieces reaches the fourth number, the evaluation unit 26 makes the evaluation based on the fixed information and the arrival direction.

Here, the first number, the second number, the third number, and the fourth number may be different from each other. Further, for example, when the number of data pieces of the communication destination information has already reached the first number, if the number of data pieces of the connection time reaches the second number, the evaluation unit 26 makes the evaluation based on the fixed information, the communication destination information, and the connection time. The same applies to other combinations.

When only some information pieces are added to the evaluation logic, it is assumed that the accuracy of the evaluation becomes inferior to the evaluation based on all the information pieces. Therefore, if the slave device is evaluated to be the unauthorized slave device when only some information pieces are added to the evaluation logic, the blocking unit 27 will not block the wireless connection, and only the informing unit 28 performs the informing.

The third embodiment has been described so far. According to this embodiment, it is possible to start the unauthorization evaluation processing earlier than in the above embodiments.

Fourth Embodiment

Next, a fourth embodiment will be described. In the above-described embodiments, an example is described in which the wireless communication apparatus 2 performs all the processes related to the unauthorized evaluation. However, other apparatuses may perform some of the processes. In this embodiment, a wireless communication system in which a server operates in cooperation with a wireless communication apparatus is described.

Figure 16:
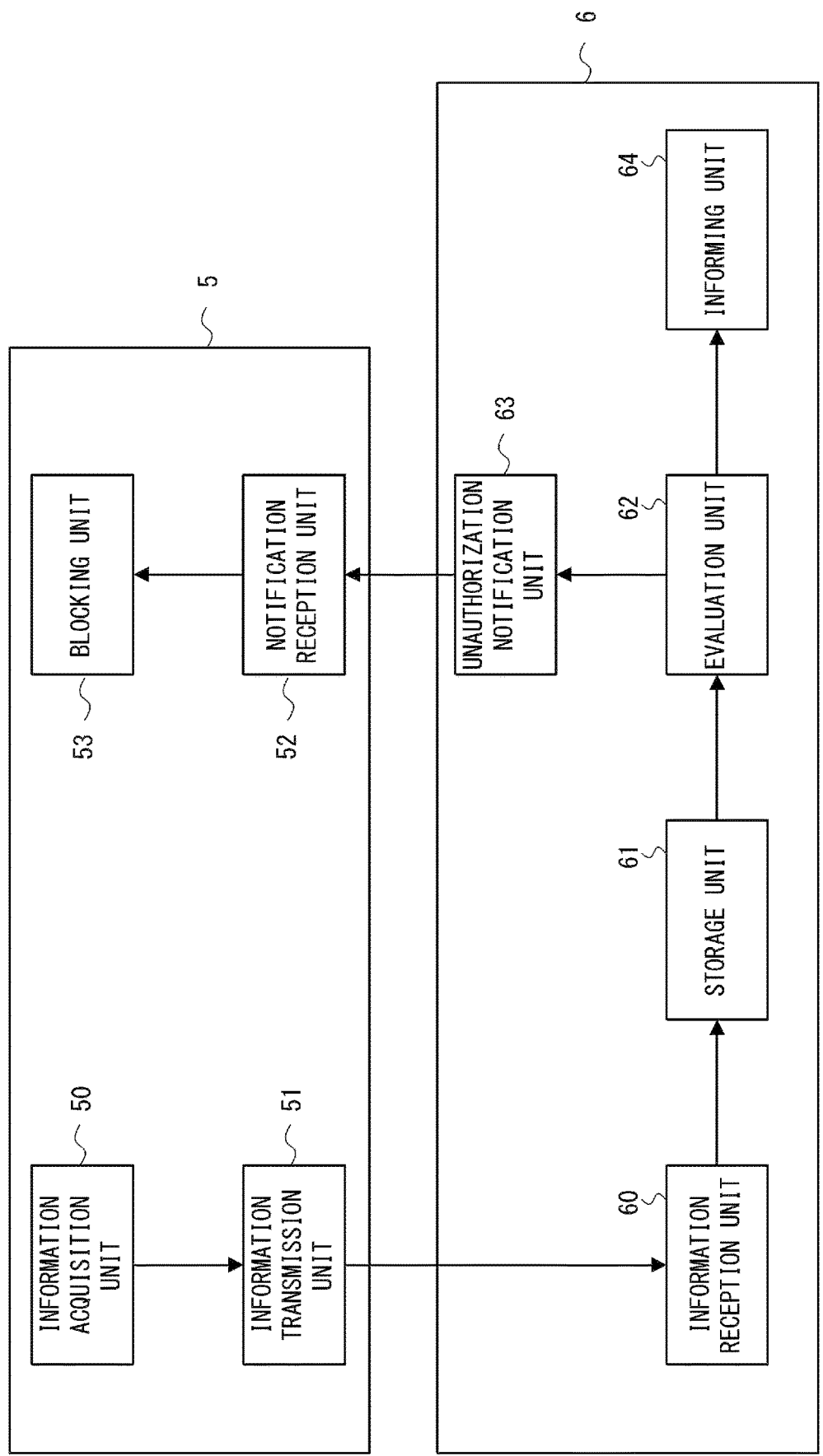
FIG. 16 is a block diagram showing an example of a configuration of a wireless communication system according to a fourth embodiment.

FIG. 16 is a block diagram showing an example of a configuration of a wireless communication system 4 according to the fourth embodiment. The wireless communication system 4 includes a wireless communication apparatus 5 and a server 6.

Like the wireless communication apparatus 2, the wireless communication apparatus 5 functions as a master device and performs wireless communication with a wireless terminal functioning as a slave device. As shown in FIG. 16, the wireless communication apparatus 5 includes an information acquisition unit 50, an information transmission unit 51, a notification reception unit 52, and a blocking unit 53. Like the above-described information acquisition unit 25, the information acquisition unit 50 includes an individual identifier acquisition unit 251, a fixed information acquisition unit 252, a communication destination information acquisition unit 253, a connection time acquisition unit 254, a received radio wave strength acquisition unit 255, and a radio wave arrival direction acquisition unit 256. The information acquisition unit 50 acquires various information about a slave device. The information acquisition unit 25 described above stores the acquired information in the storage unit 24 that is inside the wireless communication apparatus 2. However, the information acquisition unit 50 according to this embodiment outputs the acquired information to the information transmission unit 51. The information transmission unit 51 transmits the information acquired by the information acquisition unit 50 to the server 6.

The notification reception unit 52 receives, from the server 6, the notification of the occurrence of the wireless connection from the unauthorized slave device and notifies the blocking unit 53 accordingly. Like the above-described blocking unit 27, the blocking unit 53 blocks the wireless connection with the slave device that is evaluated to be unauthorized.

As shown in FIG. 16, the server 6 includes an information reception unit 60, a storage unit 61, an evaluation unit 62, an unauthorization notification unit 63, and an informing unit 64.

The information reception unit 60 receives the information acquired by the information acquisition unit 50 of the wireless communication apparatus 5 and stores it in the storage unit 61. The storage of information in the storage unit 61 corresponds to storage of information in the storage unit 24 in the above embodiments.

The evaluation unit 62 corresponds to the evaluation unit 26 of the above embodiments and, like the evaluation unit 26, makes the evaluation based on the information stored in the storage unit 61. When the evaluation unit 62 evaluates that the slave device is unauthorized, the unauthorization notification unit 63 notifies the wireless communication apparatus 5 accordingly. The informing unit 64 corresponds to the informing unit 28 of the above embodiments and, like the informing unit 28, it performs the informing.

As described above, according to this embodiment, it is possible to cause another apparatus to execute some of the processes related to the unauthorization evaluation. Thus, the configuration of the wireless communication apparatus can be simplified.

Note that the present disclosure is not limited to the above-described embodiments, and can be appropriately modified without departing from the scope of the present disclosure. For example, in the above embodiments, an example is described in which the evaluation is made whether or not the slave device is unauthorized based on a plurality of types of information. However, the evaluation may be made based only on one kind of the information. That is, in the above embodiments, the final evaluation is made according to each of the temporal evaluation results based on the plurality of kinds of information. However, for example, the evaluation result based on one kind of information may be used as the final evaluation result as it is. In consideration of the accuracy of the evaluation, it is preferable to use the fixed information or the communication destination information as the evaluation condition rather than the received radio wave strength, the radio wave arrival direction, or the connection time.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A wireless communication apparatus comprising:

information acquisition means for acquiring information about a wireless terminal when the wireless terminal is wirelessly connected to the wireless communication apparatus;

storage means for storing the information about an authorized terminal acquired by the information acquisition means in association with an individual identifier of the authorized wireless terminal; and evaluation means for evaluating as to whether or not the wireless terminal wirelessly connected to the wireless communication apparatus is an authorized wireless terminal, wherein the information includes at least fixed information other than the individual identifier, and the evaluation means makes the evaluation based on a degree of matching between the information about the wireless terminal to be evaluated acquired by the information acquisition means and the information stored in the storage means.

(Supplementary Note 2)

The wireless communication apparatus according to Supplementary note 1, wherein the fixed information is attached to a probe request packet transmitted from the wireless terminal.

(Supplementary Note 3)

The wireless communication apparatus according to Supplementary note 2, wherein the fixed information is information indicating a specification related to wireless communication attached to the probe request packet.

(Supplementary Note 4)

The wireless communication apparatus according to any one of Supplementary notes 1 to 3, wherein the information acquisition means further acquires communication destination information.

(Supplementary Note 5)

The wireless communication apparatus according to Supplementary note 4, wherein the evaluation means makes the evaluation based on the fixed information until the number of data pieces of the communication destination information, which is associated with the same individual identifier as an individual identifier of the wireless terminal to be evaluated and is stored in the storage means, and after the number of the data pieces of the communication destination information stored in the storage means reaches a predetermined number, the evaluation means makes the evaluation based on the fixed information and the communication destination information.

(Supplementary Note 6)

The wireless communication apparatus according to any one of Supplementary notes 1 to 5, wherein the information acquisition means further acquires a connection time when the wireless terminal is wirelessly connected to the wireless communication apparatus.

(Supplementary Note 7)

The wireless communication apparatus according to Supplementary note 6, wherein the information acquisition means further acquires the connection time per day of a week.

(Supplementary Note 8)

The wireless communication apparatus according to Supplementary note 6, wherein the evaluation means makes the evaluation based on the fixed information until the number of data pieces of the connection time, which is associated with the same individual identifier as an individual identifier of the wireless terminal to be evaluated and is stored in the storage means, and after the number of the data pieces of the connection time stored in the storage means reaches a predetermined number, the evaluation means makes the evaluation based on the fixed information and the connection time.

(Supplementary Note 9)

The wireless communication apparatus according to any one of Supplementary notes 1 to 8, wherein the information acquisition means further acquires received radio wave strength.

(Supplementary Note 10)

The wireless communication apparatus according to Supplementary note 9, wherein the evaluation means makes the evaluation by comparing a predetermined reference value calculated from a distribution of the received radio wave strength stored in the storage means in association with the same individual identifier as the individual identifier of the wireless terminal to be evaluated with the received radio wave strength of the wireless terminal to be evaluated.

(Supplementary Note 11)

The wireless communication apparatus according to Supplementary note 9, wherein the evaluation means makes the evaluation based on the fixed information until the number of data pieces of the received radio wave strength, which is associated with the same individual identifier as the individual identifier of the wireless terminal to be evaluated and is stored in the storage means, and after the number of the data pieces of the received radio wave strength stored in the storage means reaches a predetermined number, the evaluation means makes the evaluation based on the fixed information and the received radio wave strength.

(Supplementary Note 12)

The wireless communication apparatus according to any one of Supplementary notes 1 to 11, wherein the information acquisition means further acquires an arrival direction of radio waves from the wireless terminal that is wirelessly connected to the wireless communication apparatus.

(Supplementary Note 13)

The wireless communication apparatus according to Supplementary note 12, wherein the evaluation means makes the evaluation based on the fixed information until the number of data pieces of the arrival direction, which is associated with the same individual identifier as the individual identifier of the wireless terminal to be evaluated and is stored in the storage means, and after the number of the data pieces of the arrival direction stored in the storage means reaches a predetermined number, the evaluation means makes the evaluation based on the fixed information and the arrival direction.

(Supplementary Note 14)

The wireless communication apparatus according to any one of Supplementary notes 1 to 13, wherein the information acquisition means acquires a plurality of types of information including the fixed information, and the evaluation means makes a temporal evaluation as to whether or not the wireless terminal to be evaluated is an authorized wireless terminal for each of the plurality of types of the information and makes a final evaluation by weighting each of temporal evaluation results.

(Supplementary Note 15)

The wireless communication apparatus according to any one of Supplementary notes 1 to 14, further comprising blocking means for blocking a wireless connection with the wireless terminal when the wireless terminal to be evaluated is evaluated as an unauthorized wireless terminal by the evaluation means.

(Supplementary Note 16)

The wireless communication apparatus according to any one of Supplementary notes 1 to 15, further comprising informing means for performing informing that a wireless connection has occurred from the unauthorized wireless terminal when the wireless terminal to be evaluated is evaluated as the unauthorized wireless terminal.

(Supplementary Note 17)

The wireless communication apparatus according to any one of Supplementary notes 1 to 16, wherein the information acquisition means further acquires at least one of a connection time and received radio wave strength when the wireless terminal is wirelessly connected to the wireless communication apparatus and an arrival direction of radio waves from the wireless terminal wirelessly connected to the wireless communication apparatus, and when information associated with the individual identifier of the wireless terminal to be evaluated is not stored in the storage means, the evaluation means makes the evaluation based on the degree of matching for the information acquired by the information acquisition means among the connection time, the received radio wave strength, and the arrival direction.

(Supplementary Note 18)

A wireless communication system comprising:

information acquisition means for acquiring information about a wireless terminal when the wireless terminal is wirelessly connected to a wireless communication apparatus;

storage means for storing the information about an authorized terminal acquired by the information acquisition means in association with an individual identifier of the authorized wireless terminal; and evaluation means for evaluating as to whether or not the wireless terminal wirelessly connected to the wireless communication apparatus is an authorized wireless terminal, wherein the information includes at least fixed information other than the individual identifier, and the evaluation means makes the evaluation based on a degree of matching between the information about the wireless terminal to be evaluated acquired by the information acquisition means and the information stored in the storage means.

(Supplementary Note 19)

An evaluation method comprising:

acquiring information about a wireless terminal when the wireless terminal is wirelessly connected to a wireless communication apparatus;

storing the information about an authorized terminal acquired in association with an individual identifier of the authorized wireless terminal; and evaluating as to whether or not the wireless terminal wirelessly connected to the wireless communication apparatus is an authorized wireless terminal, wherein the information includes at least fixed information other than the individual identifier, and the evaluation is made based on a degree of matching between acquired information about the wireless terminal to be evaluated and the stored information.

(Supplementary Note 20)

A non-transitory computer readable medium storing a program, the program causing a computer to execute:

an information acquisition step of acquiring information about a wireless terminal when the wireless terminal is wirelessly connected to a wireless communication apparatus;

an storing step of storing, in a storage unit, the information about an authorized terminal acquired in the information acquisition step in association with an individual identifier of the authorized wireless terminal; and an evaluating step of evaluating as to whether or not the wireless terminal wirelessly connected to the wireless communication apparatus is an authorized wireless terminal, wherein the information includes at least fixed information other than the individual identifier, and in the evaluating step, the evaluation is made based on a degree of matching between information about the wireless terminal to be evaluated acquired in the information acquisition step and the information stored in the storage unit.

Although the present disclosure has been described with reference to the embodiments, the present disclosure is not limited by the above descriptions. Various changes that can be understood by those skilled in the art within the scope of the invention can be made to the configuration and details of the present disclosure.

The present application is based upon and claims the benefit of priority from Japanese Patent Application No. 2015-172021, filed on Sep. 1, 2015, the entire contents of which are hereby incorporated by reference.

REFERENCE SIGNS LIST 1, 2, 5 WIRELESS COMMUNICATION APPARATUS
3 WIRELESS TERMINAL
4 WIRELESS COMMUNICATION SYSTEM
6 SERVER
10, 25, 50 INFORMATION ACQUISITION UNIT
11, 24, 61 STORAGE UNIT
12, 26, 62 EVALUATION UNIT
20 WIRELESS COMMUNICATION CONTROL UNIT
21 WIRED COMMUNICATION CONTROL UNIT
27, 53 BLOCKING UNIT
28, 64 INFORMING UNIT
51 INFORMATION TRANSMISSION UNIT
52 NOTIFICATION RECEPTION UNIT
60 INFORMATION RECEPTION UNIT
63 UNAUTHORIZATION NOTIFICATION UNIT
250 STORAGE CONTROL UNIT
251 INDIVIDUAL IDENTIFIER ACQUISITION UNIT
252 FIXED INFORMATION ACQUISITION UNIT
253 COMMUNICATION DESTINATION INFORMATION ACQUISITION UNIT
254 CONNECTION TIME ACQUISITION UNIT
255 RECEIVED RADIO WAVE STRENGTH ACQUISITION UNIT
256 RADIO WAVE ARRIVAL DIRECTION ACQUISITION UNIT

What is claimed is:

1. A wireless communication apparatus comprising:

at least one memory storing program instructions; and at least one processor configured to execute the instructions to:

acquire information about a wireless terminal when the wireless terminal is wirelessly connected to the wireless communication apparatus;

store the acquired information about an authorized terminal in association with an individual identifier of the authorized wireless terminal; and evaluate as to whether or not the wireless terminal wirelessly connected to the wireless communication apparatus is an authorized wireless terminal based on a degree of matching between the acquired information about the wireless terminal to be evaluated and the stored information, wherein the information includes fixed information other than the individual identifier and other information than the fixed information, the other information is communication destination information, a connection time when the wireless terminal is wirelessly connected to the wireless communication apparatus, received radio wave strength, or an arrival direction of radio waves from the wireless terminal that is wirelessly connected to the wireless communication apparatus, and the evaluation is made based on the fixed information until the number of data pieces of the other information, which is associated with the same individual identifier as an individual identifier of the wireless terminal to be evaluated and is stored, reaches a predetermined number, and after the number of the data pieces of the stored other information reaches the predetermined number, the evaluation is made based on the fixed information and the other information.

2. The wireless communication apparatus according to claim 1, wherein the fixed information is attached to a probe request packet transmitted from the wireless terminal.

3. The wireless communication apparatus according to claim 2, wherein the fixed information is information indicating a specification related to wireless communication attached to the probe request packet.

4. The wireless communication apparatus according to claim 1, wherein the at least one processor is further configured to execute the instructions to acquire the connection time per day of a week.

5. The wireless communication apparatus according to claim 1, wherein
the other information includes received radio wave strength, and the at least one processor is further configured to execute the instructions to make the evaluation by comparing a predetermined reference value calculated from a distribution of the received radio wave strength stored in association with the same individual identifier as the individual identifier of the wireless terminal to be evaluated with the received radio wave strength of the wireless terminal to be evaluated.

6. The wireless communication apparatus according to claim 1, wherein
the at least one processor is further configured to execute the instructions to:
acquire a plurality of types of information including the fixed information, and
make a temporal evaluation as to whether or not the wireless terminal to be evaluated is an authorized wireless terminal for each of the plurality of types of the information and makes a final evaluation by weighting each of temporal evaluation results.

7. The wireless communication apparatus according to claim 1, wherein the at least one processor is further configured to execute the instructions to block a wireless connection with the wireless terminal when the wireless terminal to be evaluated is evaluated as an unauthorized wireless terminal.

8. The wireless communication apparatus according to claim 1, wherein the at least one processor is further configured to execute the instructions to perform informing that a wireless connection has occurred from the unauthorized wireless terminal when the wireless terminal to be evaluated is evaluated as the unauthorized wireless terminal.

9. The wireless communication apparatus according to claim 1, wherein
the at least one processor is further configured to execute the instructions to acquire at least one of a connection time and received radio wave strength when the wireless terminal is wirelessly connected to the wireless communication apparatus and an arrival direction of radio waves from the wireless terminal wirelessly connected to the wireless communication apparatus, and
when information associated with the individual identifier of the wireless terminal to be evaluated is not stored, the evaluation is made based on the degree of matching for the acquired information among the connection time, the received radio wave strength, and the arrival direction.

10. An evaluation method comprising:
acquiring information about a wireless terminal when the wireless terminal is wirelessly connected to a wireless communication apparatus;
storing the information about an authorized terminal acquired in association with an individual identifier of the authorized wireless terminal; and
evaluating as to whether or not the wireless terminal wirelessly connected to the wireless communication apparatus is an authorized wireless terminal based on a degree of matching between acquired information about the wireless terminal to be evaluated and the stored information, wherein
the information includes fixed information other than the individual identifier and other information than the fixed information,
the other information is communication destination information, a connection time when the wireless terminal is wirelessly connected to the wireless communication apparatus, received radio wave strength, or an arrival direction of radio waves from the wireless terminal that is wirelessly connected to the wireless communication apparatus, and
the evaluation is made based on the fixed information until the number of data pieces of the other information, which is associated with the same individual identifier as an individual identifier of the wireless terminal to be evaluated and is stored, reaches a predetermined number, and after the number of the data pieces of the stored other information reaches the predetermined number, the evaluation is made based on the fixed information and the other information.

11. A non-transitory computer readable medium storing a program, the program executed by a computer causing the computer to execute:
an information acquisition step of acquiring information about a wireless terminal when the wireless terminal is wirelessly connected to a wireless communication apparatus;
an storing step of storing, in a storage unit, the information about an authorized terminal acquired in the information acquisition step in association with an individual identifier of the authorized wireless terminal; and
an evaluating step of evaluating as to whether or not the wireless terminal wirelessly connected to the wireless communication apparatus is an authorized wireless terminal based on a degree of matching between information about the wireless terminal to be evaluated acquired in the information acquisition step and the information stored in the storage unit, wherein
the information includes fixed information other than the individual identifier and other information than the fixed information,
the other information is communication destination information, a connection time when the wireless terminal is wirelessly connected to the wireless communication apparatus, received radio wave strength, or an arrival direction of radio waves from the wireless terminal that is wirelessly connected to the wireless communication apparatus, and
in the evaluating step, the evaluation is made based on the fixed information until the number of data pieces of the other information, which is associated with the same individual identifier as an individual identifier of the wireless terminal to be evaluated and is stored, reaches a predetermined number, and after the number of the data pieces of the stored other information reaches the predetermined number, the evaluation is made based on the fixed information and the other information.

12. A wireless communication apparatus comprising:
at least one memory storing program instructions; and
at least one processor configured to execute the instructions to:
acquire information about a wireless terminal when the wireless terminal is wirelessly connected to the wireless communication apparatus;
store the acquired information about an authorized terminal in association with an individual identifier of the authorized wireless terminal; and
evaluate as to whether or not the wireless terminal wirelessly connected to the wireless communication apparatus is an authorized wireless terminal based on a degree of matching between the acquired information about the wireless terminal to be evaluated and the stored information, wherein
the information includes at least fixed information other than the individual identifier and a connection time per day of a week when the wireless terminal is wirelessly connected to the wireless communication apparatus.

13. A wireless communication apparatus comprising:
at least one memory storing program instructions; and
at least one processor configured to execute the instructions to:
acquire information about a wireless terminal when the wireless terminal is wirelessly connected to the wireless communication apparatus;
store the acquired information about an authorized terminal in association with an individual identifier of the authorized wireless terminal; and
evaluate as to whether or not the wireless terminal wirelessly connected to the wireless communication apparatus is an authorized wireless terminal based on a degree of matching between the acquired information about the wireless terminal to be evaluated and the stored information, wherein
the information includes at least fixed information other than the individual identifier and received radio wave strength and,
the at least one processor is further configured to execute the instructions to make the evaluation by comparing a predetermined reference value calculated from a distribution of the received radio wave strength stored in association with the same individual identifier as the individual identifier of the wireless terminal to be evaluated with the received radio wave strength of the wireless terminal to be evaluated.

* * * * *